United States Patent
Zhang et al.

(10) Patent No.: US 9,338,477 B2
(45) Date of Patent: May 10, 2016

(54) RECOVERING A PRUNED VERSION OF A PICTURE IN A VIDEO SEQUENCE FOR EXAMPLE-BASED DATA PRUNING USING INTRA-FRAME PATCH SIMILARITY

(75) Inventors: Dong-Qing Zhang, Bridgewater, NJ (US); Sitaram Bhagavathy, Palo Alto, CA (US); Shan He, Suwanee, GA (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/821,424

(22) PCT Filed: Sep. 9, 2011

(86) PCT No.: PCT/US2011/050924
§ 371 (c)(1),
(2), (4) Date: Mar. 7, 2013

(87) PCT Pub. No.: WO2012/033971
PCT Pub. Date: Mar. 15, 2012

(65) Prior Publication Data
US 2013/0170746 A1 Jul. 4, 2013

Related U.S. Application Data

(60) Provisional application No. 61/403,107, filed on Sep. 10, 2010.

(51) Int. Cl.
*G06K 9/36* (2006.01)
*H04N 19/85* (2014.01)
(Continued)

(52) U.S. Cl.
CPC ............ *H04N 19/85* (2014.11); *G06T 5/001* (2013.01); *H04N 19/132* (2014.11); *H04N 19/14* (2014.11);
(Continued)

(58) Field of Classification Search
None
See application file for complete search history.

(56) References Cited

U.S. PATENT DOCUMENTS

| 845,751 | A | 3/1907 | Brenzinger |
| 5,446,806 | A | 8/1995 | Ran et al. |

(Continued)

FOREIGN PATENT DOCUMENTS

| CN | 1128097 | 7/1996 |
| CN | 1276946 A | 12/2000 |

(Continued)

OTHER PUBLICATIONS

"Video Coding with Spatio-Temporal Texture Synthesis" Zhu et al Multimedia and Expo, 2007 IEEE International Conference on. Jun. 2007 pp. 112-115.*

(Continued)

*Primary Examiner* — Sean Motsinger
(74) *Attorney, Agent, or Firm* — Tutunjian & Bitetto, P.C.

(57) ABSTRACT

Method and apparatus for recovering a pruned version of a picture in a video sequence are disclosed. The apparatus includes a divider for dividing the pruned version of the picture into a plurality of non-overlapping blocks. The apparatus also includes a metadata decoder for decoding metadata for use in recovering the pruned version of the picture. The apparatus further includes a patch library creator for creating a patch library from a reconstructed version of the picture. The patch library includes a plurality of high resolution replacement patches for replacing the one or more pruned blocks during a recovery of the pruned version of the picture. The apparatus additionally includes a search and replacement device for performing a searching process using the metadata to find a corresponding patch for a respective one of the one or more pruned blocks from among the plurality of non-overlapping blocks and replace the respective one of the one or more pruned blocks with the corresponding patch. The signature is respectively created for each of the one or more pruned blocks, and the pruned version of the picture is recovered by comparing respective distance metrics from signatures for each of the plurality of high resolution patches to signatures for each of the one or more pruned blocks, sorting the respective distance metrics to obtain a rank list for each of the one or more pruned blocks, wherein a rank number in the rank list for a particular one of the one or more pruned blocks is used to retrieve a corresponding one of the plurality of high resolution patches in the patch library to be used to replace the particular one of the one or more pruned blocks. A patch dependency graph having a plurality of nodes and a plurality of edges is used to recover the pruned version of the picture. Each of the plurality of nodes represents a respective one of the plurality of overlapping blocks, and each of the plurality of edges represents a respective dependency of at least the respective one of the plurality of overlapping blocks.

12 Claims, 26 Drawing Sheets

(51) Int. Cl.
*G06T 5/00* (2006.01)
*H04N 19/176* (2014.01)
*H04N 19/46* (2014.01)
*H04N 19/196* (2014.01)
*H04N 19/61* (2014.01)
*H04N 19/593* (2014.01)
*H04N 19/463* (2014.01)
*H04N 19/132* (2014.01)
*H04N 19/14* (2014.01)
*H04N 19/44* (2014.01)
*H04N 19/587* (2014.01)
*H04N 19/97* (2014.01)
*H04N 19/59* (2014.01)

(52) U.S. Cl.
CPC ........... *H04N 19/176* (2014.11); *H04N 19/196* (2014.11); *H04N 19/44* (2014.11); *H04N 19/46* (2014.11); *H04N 19/463* (2014.11); *H04N 19/587* (2014.11); *H04N 19/59* (2014.11); *H04N 19/593* (2014.11); *H04N 19/61* (2014.11); *H04N 19/97* (2014.11)

(56) References Cited

U.S. PATENT DOCUMENTS

| | | |
|---|---|---|
| 5,537,155 A | 7/1996 | O'Connell et al. |
| 5,557,684 A | 9/1996 | Wang et al. |
| 5,754,236 A | 5/1998 | Lee |
| 5,764,374 A | 6/1998 | Seroussi et al. |
| 5,768,434 A | 6/1998 | Ran |
| 5,784,491 A | 7/1998 | Koga |
| 5,822,465 A | 10/1998 | Normile et al. |
| 5,862,342 A | 1/1999 | Winter et al. |
| 6,173,089 B1 | 1/2001 | Van Lerberghe |
| 6,278,446 B1 | 8/2001 | Liou et al. |
| 6,397,166 B1 | 5/2002 | Leung et al. |
| 6,526,183 B1 | 2/2003 | Bonnet et al. |
| 6,795,578 B1 | 9/2004 | Kotani et al. |
| 6,798,834 B1 | 9/2004 | Murakami et al. |
| 7,386,049 B2 | 6/2008 | Garrido et al. |
| 7,433,526 B2 | 10/2008 | Apostolopoulos et al. |
| 7,447,337 B2 | 11/2008 | Zhang et al. |
| 7,623,706 B1 | 11/2009 | Maurer |
| 7,643,690 B2 | 1/2010 | Suzuki et al. |
| 7,671,894 B2 | 3/2010 | Yea et al. |
| 7,715,658 B2 | 5/2010 | Cho et al. |
| 8,340,463 B1 | 12/2012 | Cho et al. |
| 8,831,107 B2 | 9/2014 | Zheng et al. |
| 9,031,130 B2 | 5/2015 | Suzuki et al. |
| 2001/0055340 A1 | 12/2001 | Kim et al. |
| 2002/0009230 A1 | 1/2002 | Sun et al. |
| 2002/0036705 A1 | 3/2002 | Lee et al. |
| 2002/0172434 A1 | 11/2002 | Freeman et al. |
| 2003/0005258 A1 | 1/2003 | Modha et al. |
| 2003/0021343 A1* | 1/2003 | Trovato .................. 375/240.08 |
| 2003/0058943 A1* | 3/2003 | Zakhor et al. ............ 375/240.12 |
| 2004/0001705 A1 | 1/2004 | Soupliotis et al. |
| 2004/0017852 A1 | 1/2004 | Garrido et al. |
| 2004/0170330 A1 | 9/2004 | Fogg |
| 2004/0213345 A1 | 10/2004 | Holcomb et al. |
| 2004/0218834 A1 | 11/2004 | Bishop et al. |
| 2004/0258148 A1* | 12/2004 | Kerbiriou et al. ........ 375/240.01 |
| 2005/0015259 A1 | 1/2005 | Thumpudi et al. |
| 2005/0019000 A1 | 1/2005 | Lim et al. |
| 2005/0225553 A1 | 10/2005 | Chi |
| 2005/0243921 A1 | 11/2005 | Au et al. |
| 2006/0013303 A1 | 1/2006 | Nguyen et al. |
| 2006/0039617 A1 | 2/2006 | Makai et al. |
| 2006/0088191 A1 | 4/2006 | Zhang et al. |
| 2006/0126960 A1 | 6/2006 | Zhou et al. |
| 2006/0239345 A1 | 10/2006 | Taubman |
| 2006/0245502 A1 | 11/2006 | Cheng et al. |
| 2006/0269149 A1 | 11/2006 | Song |
| 2007/0014354 A1 | 1/2007 | Murakami et al. |
| 2007/0041663 A1 | 2/2007 | Cho et al. |
| 2007/0118376 A1 | 5/2007 | Mukerjee |
| 2007/0223808 A1 | 9/2007 | Kerr |
| 2007/0223825 A1 | 9/2007 | Ye et al. |
| 2007/0248272 A1 | 10/2007 | Sun et al. |
| 2008/0107346 A1 | 5/2008 | Zhang et al. |
| 2008/0117975 A1 | 5/2008 | Sasai et al. |
| 2008/0131000 A1 | 6/2008 | Tsai et al. |
| 2008/0152243 A1 | 6/2008 | Min et al. |
| 2008/0159401 A1 | 7/2008 | Lee et al. |
| 2008/0172379 A1 | 7/2008 | Uehara et al. |
| 2008/0187305 A1 | 8/2008 | Raskar et al. |
| 2009/0002379 A1 | 1/2009 | Baeza et al. |
| 2009/0003443 A1 | 1/2009 | Guo et al. |
| 2009/0041367 A1* | 2/2009 | Mansour ........................ 382/252 |
| 2009/0080804 A1 | 3/2009 | Hamada et al. |
| 2009/0097564 A1 | 4/2009 | Chen et al. |
| 2009/0097756 A1 | 4/2009 | Kato |
| 2009/0116759 A1 | 5/2009 | Suzuki et al. |
| 2009/0175538 A1 | 7/2009 | Bronstein et al. |
| 2009/0180538 A1 | 7/2009 | Visharam et al. |
| 2009/0185747 A1 | 7/2009 | Segall et al. |
| 2009/0196350 A1 | 8/2009 | Xiong |
| 2009/0232215 A1 | 9/2009 | Park et al. |
| 2009/0245587 A1 | 10/2009 | Holcomb et al. |
| 2009/0252431 A1 | 10/2009 | Lu et al. |
| 2009/0274377 A1 | 11/2009 | Kweon et al. |
| 2010/0046845 A1 | 2/2010 | Wedi et al. |
| 2010/0074549 A1 | 3/2010 | Zhang et al. |
| 2010/0091846 A1 | 4/2010 | Suzuki et al. |
| 2010/0104184 A1 | 4/2010 | Bronstein et al. |
| 2010/0150394 A1 | 6/2010 | Bloom et al. |
| 2010/0196721 A1 | 8/2010 | Ogawa |
| 2010/0208814 A1 | 8/2010 | Xiong et al. |
| 2010/0272184 A1 | 10/2010 | Fishbain et al. |
| 2011/0007800 A1 | 1/2011 | Zheng et al. |
| 2011/0047163 A1 | 2/2011 | Chechik et al. |
| 2011/0142330 A1 | 6/2011 | Min et al. |
| 2011/0170615 A1 | 7/2011 | Vo et al. |
| 2011/0210960 A1 | 9/2011 | Touma et al. |
| 2011/0261886 A1 | 10/2011 | Suzuki et al. |
| 2012/0106862 A1 | 5/2012 | Sato |
| 2012/0155766 A1 | 6/2012 | Zhang et al. |
| 2012/0201475 A1 | 8/2012 | Carmel et al. |
| 2012/0320983 A1 | 12/2012 | Zheng et al. |
| 2013/0163676 A1 | 6/2013 | Zhang et al. |
| 2013/0163679 A1 | 6/2013 | Zhang et al. |
| 2013/0170746 A1* | 7/2013 | Zhang et al. .................. 382/165 |
| 2014/0036054 A1 | 1/2014 | Zouridakis |
| 2014/0056518 A1 | 2/2014 | Yano et al. |

FOREIGN PATENT DOCUMENTS

| | | |
|---|---|---|
| CN | 1495636 | 5/2004 |
| CN | 1777287 | 5/2006 |
| CN | 1863272 | 11/2006 |
| CN | 101048799 | 10/2007 |
| CN | 101198064 | 6/2008 |
| CN | 101389021 | 3/2009 |
| CN | 101459842 | 6/2009 |
| CN | 101551903 | 10/2009 |
| CN | 101556690 | 10/2009 |
| EP | 1401211 | 3/2004 |
| EP | 1659532 | 5/2006 |
| FR | 2941581 | 7/2010 |
| JP | 3027670 | 2/1991 |
| JP | 7222145 | 8/1995 |
| JP | 7231444 | 8/1995 |
| JP | 8502865 | 3/1996 |
| JP | 8336134 | 12/1996 |
| JP | 2000215318 | 8/2000 |
| JP | 2003018398 | 1/2003 |
| JP | 2004266794 | 9/2004 |
| JP | 200520761 | 1/2005 |
| JP | 2006519533 | 8/2006 |
| JP | 2008289005 | 11/2008 |
| JP | 200977189 | 4/2009 |
| JP | 2009267710 | 11/2009 |

(56) References Cited

FOREIGN PATENT DOCUMENTS

| | | |
|---|---|---|
| JP | 2010514325 | 4/2010 |
| JP | 2011501542 | 1/2011 |
| KR | 0169662 | 10/1998 |
| WO | WO9406099 | 3/1994 |
| WO | WO9819450 | 5/1998 |
| WO | WO03084238 | 10/2003 |
| WO | WO03102868 | 12/2003 |
| WO | WO2005043882 | 5/2005 |
| WO | WO2006025339 | 3/2006 |
| WO | WO2007111966 | 10/2007 |
| WO | WO2008066025 | 6/2008 |
| WO | WO2009052742 | 4/2009 |
| WO | WO2009087641 | 7/2009 |
| WO | WO2009094036 | 7/2009 |
| WO | WO2009157904 | 12/2009 |
| WO | WO2010033151 | 3/2010 |
| WO | WO2011090798 | 7/2011 |

OTHER PUBLICATIONS

"An Encoder-Decoder Texture Replacement Method with Application to Content-Based Movie Coding" Dumitras et al. IEEE Transations on Circuits and Systems for Video Technology 2004.*
"Video Coding with Spatio-Temporal Texture synthesis and Edge-Based Inpainting" Zhu et al IEEE 2008.*
Barreto et al., "Region-Based Super-Resolution for Compression," Multidemensional Systems and Signal Processing, Kluwer, Amsterdam, NL, Mar. 8, 2007, vol. 18, No. 2-3, pp. 59-81.
Black et al., "The Robust Estimation of Multiple Motions: Parametric and Piecewise-Smooth Flow Fields," Computer Vision and Image Understanding, vol. 63, No. 1, Jan. 1996, pp. 75-104, Academic Press, Orlando, FL, USA.
Fischler et al., "Random Sample Consensus: A Paradigm for Model Fitting with Applications to Image Analysis and Automated Cartography," Communications of the AACM, vol. 24, No. 6, Jun. 1981, pp. 381-395, ACM Press, NY, NY, USA.
Park et al., "Super-Resolution Image Reconstruction: A Technical Overview," IEEE Signal Processing Magazine, vol. 20, No. 3, May 2003, pp. 21-36.
Torr et al., "MLESAC: A New Robust Estimator with Application to Estimating Image Geometry," Computer Vision and Image Understanding, vol. 78, No. 1, Apr. 2000, pp. 138-156, Academic Press, Orlando, FL, USA.
Cheng et al., "Reduced Resolution Residual Coding for H.264-based Compression System," Proceedings of the 2006 IEEE Int'l. Symposium on Circuits and Systems (ISCAS 2006), May 21, 2006, pp. 3486-3489.
Moffat et al., "Chapter 3. Static Codes," Compression and Coding Algorithms, Feb. 2002, pp. 29-50.
Zhang et al., "A Pattern-based Lossy Compression Scheme for Document Images," Electronic Publishing, vol. 8, No. 2-3, Sep. 24, 1995. pp. 221-233.
Bishop et al., "Super-resolution Enhancement of Video," Proceedings of the 9th Int'l. Workshop on Artificial Intelligence and Statistics, Jan. 3, 2003, pp. 1-8, Society for Artificial Intelligence and Statistics, Key West, Florida.
Shen et al., "Optimal Pruning Quad-Tree Block-Based Binary Shape Coding", IEEE Proceedings 2007, International Conference on Image Processing, ICIP, 2007, pp. V1-437-V1-440.
Han et al., "Rank-based Image Transformation for Entropy Coding Efficiently", Proceedings of the Fourth Annual ACIS International Conference on Computer and Information Science (ICIS'05), IEEE 2005.
Xu et al., Probability Updating-based Adaptive Hybrid Coding (PUAHC), ISCAS 2006, IEEE 2006, pp. 361-364.
Zhang et al., "Method and Apparatus for Data Pruning for Video Compression Using Example-Based Super-Resolution", Invention Disclosure, Apr. 2010.
Dumitras et al., "A Texture Replacement Method at the Encoder for Bit-Rate Reduction of Compressed Video", IEEE Transactions on Circuits and Systems for Video Technology, vol. 13, No. 2, Feb. 2003, pp. 163-175.
Yap et al., "Unsupervised Texture Segmentation Using Dominant Image Modulations", IEEE Conference Recordings of the 34th Asilomar Conference on Signals, Systems and Computers, IEEE 2000, pp. 911-915.
Sermadevi et al., "Efficient Bit Allocation for Dependent Video Coding", Proceedings of the Data Compression Conference (DCC'04), IEEE, 2004.
Krutz et al., Windowed Image Registration for Robust Mosaicing of Scenes with Large Background Occlusions, ICIP 2006. vols. 1-7, IEEE, 2006, pp. 353-356.
Dorr et al., "Clustering Sequences by Overlap", International Journal Data Mining and Bioinformatics, vol. 3. No. 3, 2009, pp. 260-279.
Zhu et al., "Video Coding with Spatio-Temporal Texture Synthesis", Proceedings of the 2007 IEEE International Conference on Multimedia and Expo, Jul. 1, 2007, pp. 112-115.
Wu et al., Image Compression by Visual Pattern Vector Quantization (VPVQ), Proceedings of the 2008 Data Compression Conference, Mar. 25, 2008, pp. 123-131.
Vo et al, "Data Pruning-Based Compression Using High Order Edge-Directed Interpolation", IEEE Conference on Acoustics, Speech and Signal Processing, Taiwan ROC, 2009, pp. 997-1000.
Smolic et al., "Improved Video Coding Using Long-term Global Motion Compensation", Visual Communications and Image Processing, Jan. 20, 2004, pp. 343-354.
Schuster et al., "An Optimal Polygonal Boundary Encoding Scheme in the Rate Distortion Sense", IEEE Transactions on Image Processing, vol. 7, No. 1, Jan. 1998, pp. 13-26.
Sun et al., "Classified Patch Learning for Spatially Scalable Video Coding", Proceedings of the 16th IEEE International Conference on Image Processing, Nov. 7, 2009, pp. 2301-2304.
Wiegand et al., "Overview of the H.264/AVC Video Coding Standard", IEEE Transactions on Circuits and Systems for Video Technology, vol. 13, No. 7, Jul. 2003, pp. 560-576.
Zheng et al., "Intra Prediction Using Template Matching with Adaptive Illumination Compensation", ICIP 2008, IEEE 2008, pp. 125-128.
Dumitras et al., "An Encoder-Decoder Texture Replacement Method with Application to Content-Based Movie Coding", IEEE Transactions on Circuits and Systems for Video Technology, vol. 14, No. 6, Jun. 2004, pp. 825-840.
Liu et al., "Intra Prediction via Edge-Based Inpainting", IEEE 2008 Data Compression Conference, Mar. 25-27, 2008, pp. 282-291.
Xiong et al., "Block-Based Image Compression with Parameter-Assistant Inpainting", IEEE Transactions on Image Processing, vol. 19, No, 6. Jun. 2010. pp. 1651-1657.
Zhu et al., "Video Coding with Spatio-Temporal Texture Synthesis and Edge-Based Inpainting", IEEE International Conference on Multimedia and Expo (ICME), 2008, pp. 813-816.
Zhang et al, "Video Decoding Using Block-based Mixed-Resolution Data Pruning", Invention Disclosure, Mar. 2010.
Porikli et al., "Compressed Domain Video Object Segmentation", IEEE Transactions on Circuits and Systems for Video Technology, vol. 20, No. 1, Jan. 2010, pp. 1-14.
Zhang et al., "Segmentation for Extended Target in Complex Backgrounds Based on Clustering and Fractal", Optics and Precision Engineering, vol. 17, No. 7, Jul. 2009, pp. 1665-1671.
Zhang et al., "Example-Based Data Pruning for Improving Video Compression Efficiency", Invention Disclosure, Apr. 2010.
Bhagavathy et al., "A Data Pruning Approach for Video Compression Using Motion-Guided Down-Sampling and Super-Resollution", submitted to ICIP 2010, pp. 1-4.
Komodakis et al., "Image Completion Using Efficient Belief Propagation Via Priority Scheduling and Dynamic Pruning", IEEE Transactions on Image Processing, vol. 16, No. 11, Nov. 1, 2007, pp. 2649-2661.
Freeman et al., "Example-based Super-Resolution", IEEE Coomputer Graphics and Applications, Mar./Apr. 2002, pp. 56-65.
Bertalmio et al., "Image Inpainting", Proceedings of SIGGRAPH 2000, New Orleans, USA, Jul. 2000, pp. 1-8.

(56) References Cited

OTHER PUBLICATIONS

Ndjiki-Nya et al., "A Generic and Automatic Content-based Approach for Improved H.264/MPEG4-AVC Video Coding", IEEE International Conference on Image Processing (ICIP), 2005, pp. 1-4.
Lowe, "Distinctive Image Features from Scale-Invariant Keypoints", International Journal of Comoputer Vision, vol. 2, No. 60, 2004, pp. 1-28.
Vu et al., "Efficient Pruning Schemes for Distance-Based Outlier Detection", Springer Verlag, Proceedings European Conference 2009, pp. 160-175.
Zhang et al., "Video Decoding Using Blocked-Based Mixed-Resolution", Invention Disclosure, Mar. 2010.
Ben-Ezra et al., "Video Super-Resolution Using Controlled Subpixel Detector Shifts", IEEE Transactions on Pattern Analysis and Machine Intelligence, vol. 27, No. 6, Jun. 2005, pp. 977-987.
ITU-T H.264 Standard, "Advanced Video Coding for Generic Audiovisual Services", International Telecommunication Union, Mar. 2005, 343 pages.
Sawhney et al., Hybrid Stereo Camera: An IBR Approach for Synthesis of Very High Resolution Stereoscopic Image Sequences, Proc. SIGGRAPH, 2001, pp. 451-460.
Katsaggelos et al., "High-Resolution Images from Low-Resolution Compressed Video", IEEE Signal Processing Magazine, vol. 20, No. 3, May 1, 2003, pp. 37-48.
Li et al., "Example-Based Image Super-Resolution with Class-Specific Predictors", Journal of Visual Communication and Image Representation, vol. 20, No. 5, Jul. 1, 2009, pp. 312-322.
Lee et al., "Robust Frame Synchronization for Low Signal-to-Noise Ratio Channels Using Energy-Corrected Differential Correlation", EURASIP Journal on Wireless Communications and Networking, vol. 2009 (2009), Article ID 345989, online May 17, 2010, 8 pages.
International Search Report for Corresponding International Appln. PCT/US2011/050921 dated Jan. 4, 2012.
International Search Report for Corresponding International Appln. PCT/US2011/050923 dated Jan. 5, 2012.
International Search Report for Corresponding InternationalAppln. PCT/US2011/050913 dated Jul. 30, 2012.
International Search Report for Corresponding InternationalAppln. PCT/US2011/050915 dated Jul. 30, 2012.
International Search Report for Corresponding International Appln. PCT/US2011/050918 dated Jan. 5, 2012.
International Search Report for Corresponding International Appln. PCT/US2011/050920 dated Jan. 4, 2012.
International Search Report for Corresponding International Appln. PCT/US2011/050922 dated Jan. 4, 2012.
International Search Report for International Application PCT/US11/050924 dated Jan. 5, 2012.
International Search Report for Corresponding International Appln. PCT/US2011/000107 dated Apr. 20, 2011.
International Search Report for Corresponding International Appln. PCT/US2011/000117 dated Apr. 29, 2011.
International Search Report for Corresponding International Appln. PCT/US2011/050913 dated Jul. 30, 2012.
International Search Report for Corresponding International Appln. PCT/US2011/050917 dated Jan. 5, 2012.
International Search Report for Corresponding International Appln. PCT/US2011/050919 dated Jan. 4, 2012.
International Search Report for Corresponding Appln. PCT/US2011/050925 dated Jan. 6, 2012.
Notice of Allowance for Corresponding U.S. Appl. No. 13/574,428 dated Feb. 20, 2015.
Non-Final OA for Corresponding U.S. Appl. No. 13/522,024 dated Mar. 27, 2015.
US Office Action for Related U.S. Appl. No. 13/821,078, Dated Jun. 5, 2015.
US Office Action for Related U.S. Appl. No. 13/821,436, Dated Jun. 18, 2015.
US Office Action for Related U.S. Appl. No. 13/820,901, Dated May 5, 2015.
US Office Action for Related U.S. Appl. No. 13/821,130, Dated Jun. 16, 2015.
US Office Action for Related U.S. Appl. No. 13/821,393, Dated Jul. 10, 2015.
US Office Action for Related U.S. Appl. No. 13/821,270, Dated Jul. 16, 2015.
US Office Action for Related U.S. Appl. No. 13/821,083, Dated Jul. 16, 2015.
Non-Final US Office Action for related U.S. Appl. No. 13/821,357, dated Aug. 13, 2015.
Non-Final Office Action for related U.S. Appl. No. 13/821,257, dated Aug. 19, 2015.
Non-Final Office Action for related U.S. Appl. No. 13/821,283, dated Aug. 17, 2015.
Non-Final Office Action for related U.S. Appl. No. 13/821,083, dated Jul. 16, 2015.
Non-Final Office Action for related U.S. Appl. No. 13/821,270, dated Jul. 16, 2015.
Symes, "Digital Video Compression," McGraw-Hill, 2004, ISBN 0-07-142487, pp. 116-121 and 242-243.
Non-Final Office Action for related U.S. Appl. No. 13/821,130, dated Jun. 16, 2015.
China Search Report for Related CN Application No. 201180043595.3 Dated Aug. 18, 2015.
CN Search Report for Related CN Application No. 2011800432758 dated Sep. 23, 2015 CN version.
CN Search Report for Related CN Application No. 201180006921.3 dated Nov. 21, 2014.
CN Search Report for Related CN Application No. 2011800153355 dated Nov. 22, 2014.
CN Search Report for Related CN Application 2011800437234 dated Sep. 16, 2015.
CN Search Report for Related CN Application 201180054419X dated Sep. 8, 2015.
CN Search Report for Related CN Application 2011800432940 dated Jul. 28, 2015.
CN Search Report for Related CN Application 201180053976A dated Sep. 23, 2015.
CN Search Report for related CN Application 20111800153355 dated Sep. 16, 2015.
CN Search Report for related CN Application 2011800544058 dated Nov. 30, 2015.
US Office Action for Related U.S. Appl. No. 13/820,901, dated Dec. 18, 2015.
US Office Action for Related U.S. Appl. No. 13/821,257, dated Dec. 21, 2015.
US Office Action for Related U.S. Appl. No. 13/821,130, dated Jan. 14, 2016.
US Office Action for Related U.S. Appl. No. 13/821,357, dated Dec. 21, 2015.
US Office Action for Related U.S. Appl. No. 13/821,393, dated Dec. 11, 2015.
US Office Action for Related U.S. Appl. No. 13/821,078, dated Jan. 13, 2016.
US Office Action for Related U.S. Appl. No. 13/821,283, dated Dec. 22, 2015.
US Office Action for Related U.S. Appl. No. 13/821,083, dated Jan. 29, 2016.
US Office Action for Related U.S. Appl. No. 13/821,436, dated Nov. 25. 2015.

* cited by examiner

RECOVERING A PRUNED VERSION OF A PICTURE IN A VIDEO SEQUENCE FOR EXAMPLE-BASED DATA PRUNING USING INTRA-FRAME PATCH SIMILARITY

CROSS-REFERENCE TO RELATED APPLICATIONS

This application claims the benefit, under 35 U.S.C. §365 of International Application PCT/US2011/050924, filed Sep. 9, 2011, which was published in accordance with PCT Article 21(2) on Mar. 15, 2012 in English and which claims the benefit of U.S. provisional patent application No. 61/403,107, filed Sep. 10, 2010.

This application is related to the following, commonly-owned, patent applications:

(1) International (PCT) Patent Application Serial No. PCT/US11/000107 entitled METHODS AND APPARATUS FOR SAMPLING-BASED SUPER-RESOLUTION VIDEO ENCODING AND DECODING filed on Jan. 20, 2011;
(2) International (PCT) Patent Application Serial No. PCT/US11/000117 entitled DATA PRUNING FOR VIDEO COMPRESSION USING EXAMPLE-BASED SUPER-RESOLUTION filed on Jan. 21, 2011;
(3) International (PCT) Patent Application Serial No. PCT/US11/050913 entitled METHODS AND APPARATUS FOR ENCODING VIDEO SIGNALS USING MOTION COMPENSATED EXAMPLE-BASED SUPER-RESOLUTION FOR VIDEO COMPRESSION filed on Sep. 9, 2011;
(4) International (PCT) Patent Application Serial No. PCT/US11/050915 entitled METHODS AND APPARATUS FOR DECODING VIDEO SIGNALS USING MOTION COMPENSATED EXAMPLE-BASED SUPER-RESOLUTION FOR VIDEO COMPRESSION filed on Sep. 9, 2011;
(5) International (PCT) Patent Application Serial No. PCT/US11/050917 entitled VIDEO ENCODING USING EXAMPLE-BASED DATA PRUNING filed on Sep. 9, 2011;
(6) International (PCT) Patent Application Serial No. PCT/US11/050918 entitled VIDEO DECODING USING EXAMPLE-BASED DATA PRUNING filed on Sep. 9, 2011;
(7) International (PCT) Patent Application Serial No. PCT/US11/050919 entitled VIDEO ENCODING USING BLOCK-BASED MIXED-RESOLUTION DATA PRUNING filed on Sep. 9, 2011;
(8) International (PCT) Patent Application Serial No. PCT/US11/050920 entitled VIDEO DECODING USING BLOCK-BASED MIXED-RESOLUTION DATA PRUNING filed on Sep. 9, 2011;
(9) International (PCT) Patent Application Serial No. PCT/US11/050921 entitled ENCODING OF THE LINK TO A REFERENCE BLOCK IN VIDEO COMPRESSION BY IMAGE CONTENT BASED SEARCH AND RANKING filed on Sep. 9, 2011;
(10) International (PCT) Patent Application Serial No. PCT/US11/050922 entitled DECODING OF THE LINK TO A REFERENCE BLOCK IN VIDEO COMPRESSION BY IMAGE CONTENT BASED SEARCH AND RANKING filed on Sep. 9, 2011;
(11) International (PCT) Patent Application Serial No. PCT/US11/050923 entitled ENCODING OF A PICTURE IN VIDEO SEQUENCE BY EXAMPLE-BASED DATA PRUNING USING INTRA-FRAME PATCH SIMILARITY filed on Sep. 9, 2011;
(12) International (PCT) Patent Application Serial No. PCT/US11/050925 entitled METHOD AND APPARATUS FOR PRUNING DECISION OPTIMIZATION IN EXAMPLE-BASED DATA PRUNING COMPRESSION filed on Sep. 9, 2011.

BACKGROUND OF THE INVENTION

1. Field of the Invention

The present principles relate generally to video encoding and decoding and, more particularly, to methods and apparatus for example-based data pruning using intra-frame patch similarity.

2. Background Information

Data pruning is a video preprocessing technology that achieves better video coding efficiency by removing part of the input video data before the input video data is encoded. The removed video data is recovered at the decoder side by inferring the removed video data from the decoded data. One example of data pruning is image line removal, which removes some of the horizontal and vertical scan lines in the input video.

In a first approach, a new data pruning method called example-based data pruning is employed, in which external videos or video frames that have been previously transmitted to the decoder side are used to train an example patch library. The patch library is then used to prune and recover the video data.

There have been several efforts to explore using data pruning to increase compression efficiency. For example, in a second approach and a third approach, a texture replacement based method is used to remove texture regions at the encoder side, and re-synthesize the texture regions at the decoder side. Compression efficiency is gained because only synthesis parameters are sent to the decoder, which are smaller than the regular transformation coefficients. In a fourth approach and a fifth approach, spatio-temporal texture synthesis and edge-based inpainting are used to remove some of the regions at the encoder side, and the removed content is recovered at the decoder side, with the help of metadata such as region masks. However, the fourth and fifth approaches need to modify the encoder and decoder so that the encoder/decoder can selectively perform encoding/decoding for some of the regions using the region masks. Therefore, it is not exactly an out-of-loop approach (i.e., the encoder and decoder need to be modified). In a sixth approach, a line removal based method is proposed to restate a video to a smaller size by selectively removing some of the horizontal or vertical lines in the video with a least-square minimization framework. The sixth approach is an out-of-loop approach, and does not require modification of the encoder/decoder. However, completely removing certain horizontal and vertical lines may result in loss of information or details for some videos.

Some preliminary research on data pruning for video compression has been conducted. For example, in a seventh approach, a data pruning scheme using sampling-based super-resolution is presented. The full resolution frame is sampled into several smaller-sized frames, therefore reducing the spatial size of the original video. At the decoder side, the high-resolution frame is re-synthesized from the down-sampled frames with the help of metadata received from the encoder side. In an eighth approach, an example-based super-resolution based method for data pruning is presented. A representative patch library is trained from the original video. Afterwards, the video is downsized to a smaller size. The downsized video and the patch library are sent to the decoder side. The recovery process at the decoder side super-resolves the downsized video by example-based super-resolution using the patch library. However because there is substantial redundancy between the patch library and downsized frames, it has been discovered that it may be difficult to achieve compression gain using the eighth approach.

In the aforementioned first approach, an example-based data pruning method creates a patch library using the video frames that have been sent to the decoder side and uses the patch library to prune and recover video frames. However, this method does not consider the intra-frame patch dependency, which may happen if there are repetitive textures or patterns in a video frame.

In the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), intra-frame block prediction is realized by block prediction from the neighboring blocks. However, long-range similarity of non-neighboring blocks is not exploited to increase compression efficiency.

These and other drawbacks and disadvantages of these approaches are addressed by the present principles, which are directed to methods and apparatus for example-based data pruning using intra-frame patch similarity.

SUMMARY

According to an aspect of the present principles, there is provided an apparatus for encoding a picture in a video sequence. The apparatus includes a patch library creator for creating a first patch library from an original version of the picture and a second patch library from a reconstructed version of the picture. Each of the first patch library and the second patch library includes a plurality of high resolution replacement patches for replacing one or more pruned blocks during a recovery of a pruned version of the picture. The apparatus also includes a pruner for generating the pruned version of the picture from the first patch library. The apparatus further includes a metadata generator for generating metadata from the second patch library. The metadata is for recovering the pruned version of the picture. The apparatus additionally includes an encoder for encoding the pruned version of the picture and the metadata. The first patch library includes a plurality of patch clusters, and the pruned version of the picture is generated by dividing the original version of the picture into a plurality of overlapping blocks, searching for candidate patch clusters from among the plurality of patch clusters for each of the plurality of overlapping blocks based on respective distance metrics from each of the plurality of overlapping blocks to respective centers of each of the plurality of patch clusters, identifying a best matching patch from the candidate patch clusters based on one or more criterion, and pruning a corresponding one of the plurality of overlapping blocks to obtain a pruned block there for when a difference between the corresponding one of the plurality of overlapping blocks and the best matching patch is less than a threshold difference. A patch dependency graph having a plurality of nodes and a plurality of edges is used for the searching. Each of the plurality of nodes represents a respective one of the plurality of overlapping blocks, and each of the plurality of edges represents a respective dependency of at least the respective one of the plurality of overlapping blocks.

According to another aspect of the present principles, there is provided a method for encoding a picture in a video sequence. The method includes creating a first patch library from an original version of the picture and a second patch library from a reconstructed version of the picture. Each of the first patch library and the second patch library includes a plurality of high resolution replacement patches for replacing one or more pruned blocks during a recovery of a pruned version of the picture. The method also includes generating the pruned version of the picture from the first patch library. The method further includes generating metadata from the second patch library. The metadata is for recovering the pruned version of the picture. The method additionally includes encoding the pruned version of the picture and the metadata. The first patch library includes a plurality of patch clusters, and the pruned version of the picture is generated by dividing the original version of the picture into a plurality of overlapping blocks, searching for candidate patch clusters from among the plurality of patch clusters for each of the plurality of overlapping blocks based on respective distance metrics from each of the plurality of overlapping blocks to respective centers of each of the plurality of patch clusters, identifying a best matching patch from the candidate patch clusters based on one or more criterion, and pruning a corresponding one of the plurality of overlapping blocks to obtain a pruned block there for when a difference between the corresponding one of the plurality of overlapping blocks and the best matching patch is less than a threshold difference. A patch dependency graph having a plurality of nodes and a plurality of edges is used for the searching. Each of the plurality of nodes represents a respective one of the plurality of overlapping blocks, and each of the plurality of edges represents a respective dependency of at least the respective one of the plurality of overlapping blocks.

According to still another aspect of the present principles, there is provided an apparatus for recovering a pruned version of a picture in a video sequence. The apparatus includes a divider for dividing the pruned version of the picture into a plurality of non-overlapping blocks. The apparatus also includes a metadata decoder for decoding metadata for use in recovering the pruned version of the picture. The apparatus further includes a patch library creator for creating a patch library from a reconstructed version of the picture. The patch library includes a plurality of high resolution replacement patches for replacing the one or more pruned blocks during a recovery of the pruned version of the picture. The apparatus additionally includes a search and replacement device for performing a searching process using the metadata to find a corresponding patch for a respective one of the one or more pruned blocks from among the plurality of non-overlapping blocks and replace the respective one of the one or more pruned blocks with the corresponding patch. The signature is respectively created for each of the one or more pruned blocks, and the pruned version of the picture is recovered by comparing respective distance metrics from signatures for each of the plurality of high resolution patches to signatures for each of the one or more pruned blocks, sorting the respective distance metrics to obtain a rank list for each of the one or more pruned blocks, wherein a rank number in the rank list for a particular one of the one or more pruned blocks is used to retrieve a corresponding one of the plurality of high resolution patches in the patch library to be used to replace the particular one of the one or more pruned blocks. A patch dependency graph having a plurality of nodes and a plurality of edges is used to recover the pruned version of the picture. Each of the plurality of nodes represents a respective one of the plurality of overlapping blocks, and each of the plurality of edges represents a respective dependency of at least the respective one of the plurality of overlapping blocks.

According to a further aspect of the present principles, there is provided a method for recovering a pruned version of a picture in a video sequence. The method includes dividing the pruned version of the picture into a plurality of non-overlapping blocks. The method also includes decoding metadata for use in recovering the pruned version of the picture. The method further includes creating a patch library from a reconstructed version of the picture. The patch library includes a plurality of high resolution replacement patches for replacing the one or more pruned blocks during a recovery of the pruned version of the picture. The method additionally includes performing a searching process using the metadata to find a corresponding patch for a respective one of the one or more pruned blocks from among the plurality of non-overlapping blocks and replace the respective one of the one or more pruned blocks with the corresponding patch. The signature is respectively created for each of the one or more pruned blocks, and the pruned version of the picture is recovered by comparing respective distance metrics from signatures for each of the plurality of high resolution patches to signatures for each of the one or more pruned blocks, sorting the respective distance metrics to obtain a rank list for each of the one or more pruned blocks, wherein a rank number in the rank list for a particular one of the one or more pruned blocks is used to retrieve a corresponding one of the plurality of high resolution patches in the patch library to be used to replace the particular one of the one or more pruned blocks. A patch dependency graph having a plurality of nodes and a plurality of edges is used to recover the pruned version of the picture. Each of the plurality of nodes represents a respective one of the plurality of overlapping blocks, and each of the plurality of edges represents a respective dependency of at least the respective one of the plurality of overlapping blocks.

According to a still further aspect of the present principles, there is provided an apparatus for encoding a picture in a video sequence. The apparatus includes means for creating a first patch library from an original version of the picture and a second patch library from a reconstructed version of the picture. Each of the first patch library and the second patch library includes a plurality of high resolution replacement patches for replacing one or more pruned blocks during a recovery of a pruned version of the picture. The apparatus also includes means for generating the pruned version of the picture from the first patch library. The apparatus further includes means for generating metadata from the second patch library, the metadata for recovering the pruned version of the picture. The apparatus additionally includes means for encoding the pruned version of the picture and the metadata. The first patch library includes a plurality of patch clusters, and the pruned version of the picture is generated by dividing the original version of the picture into a plurality of overlapping blocks, searching for candidate patch clusters from among the plurality of patch clusters for each of the plurality of overlapping blocks based on respective distance metrics from each of the plurality of overlapping blocks to respective centers of each of the plurality of patch clusters, identifying a best matching patch from the candidate patch clusters based on one or more criterion, and pruning a corresponding one of the plurality of overlapping blocks to obtain a pruned block there for when a difference between the corresponding one of the plurality of overlapping blocks and the best matching patch is less than a threshold difference. A patch dependency graph having a plurality of nodes and a plurality of edges is used for the searching. Each of the plurality of nodes represents a respective one of the plurality of overlapping blocks, and each of the plurality of edges represents a respective dependency of at least the respective one of the plurality of overlapping blocks.

According to an additional aspect of the present principles, there is provided an apparatus for recovering a pruned version of a picture in a video sequence. The apparatus includes means for dividing the pruned version of the picture into a plurality of non-overlapping blocks. The apparatus also includes means for decoding metadata for use in recovering the pruned version of the picture. The apparatus further includes means for creating a patch library from a reconstructed version of the picture. The patch library includes a plurality of high resolution replacement patches for replacing the one or more pruned blocks during a recovery of the pruned version of the picture. The apparatus additionally includes means for performing a searching process using the metadata to find a corresponding patch for a respective one of the one or more pruned blocks from among the plurality of non-overlapping blocks and replace the respective one of the one or more pruned blocks with the corresponding patch. The signature is respectively created for each of the one or more pruned blocks, and the pruned version of the picture is recovered by comparing respective distance metrics from signatures for each of the plurality of high resolution patches to signatures for each of the one or more pruned blocks, sorting the respective distance metrics to obtain a rank list for each of the one or more pruned blocks, wherein a rank number in the rank list for a particular one of the one or more pruned blocks is used to retrieve a corresponding one of the plurality of high resolution patches in the patch library to be used to replace the particular one of the one or more pruned blocks. A patch dependency graph having a plurality of nodes and a plurality of edges is used to recover the pruned version of the picture. Each of the plurality of nodes represents a respective one of the plurality of overlapping blocks, and each of the plurality of edges represents a respective dependency of at least the respective one of the plurality of overlapping blocks.

BRIEF DESCRIPTION OF THE DRAWINGS

These and other aspects, features and advantages of the present principles will become apparent from the following detailed description of exemplary embodiments, which is to be read in connection with the accompanying drawings.

The present principles may be better understood in accordance with the following exemplary figures, in which.

DESCRIPTION OF THE PREFERRED EMBODIMENTS

Figure 1:
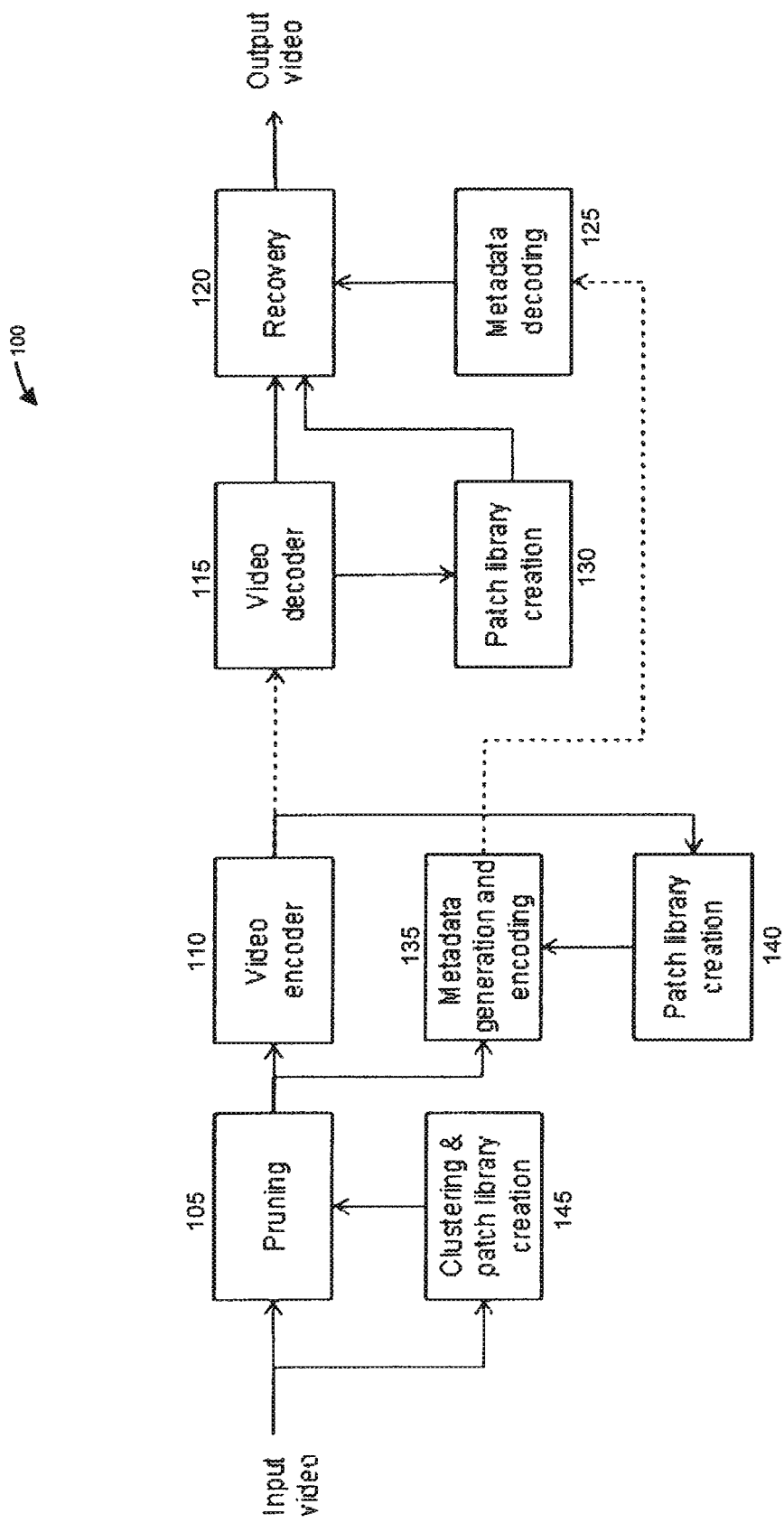
FIG. 1 is a block diagram showing an exemplary example-based data pruning system using intra-frame patch similarity, in accordance with an embodiment of the present principles.

The present principles are directed to methods and apparatus for example-based data pruning using intra-frame patch similarity.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Turning to FIG. 1, exemplary example-based data pruning system using intra-frame patch similarity is indicated generally by the reference numeral 100. The pruning system 100 includes a pruner 105 having an output connected in signal communication with an input of a video encoder 110 and a first input of a metadata generator and encoder 135. An output of the video encoder is connected in signal communication with an input of a video decoder 115 and an input of a patch library creator 140. An output of the video decoder 115 is connected in signal communication with a first input of a recovery device 120. An output of the patch library creator 130 is connected in signal communication with a second input of the recovery device 120. An output of the metadata generator and encoder 135 is connected in signal communication with an input of a metadata decoder 125. An output of the metadata decoder 125 is connected in signal communication with a third input of the recovery device 120. An output of the patch library creator 140 is connected in signal communication with a second input of the metadata generator and encoder 135. An output of a clustering device and patch library creator 145 is connected in signal communication with a second input of the pruner 105. An input of the pruner 105 and an input of the clustering device and patch library creator 145 are available as inputs to the pruning system 100, for receiving input video. An output of the recovery device is available as an output of the pruning system 100, for outputting video.

Figure 2:
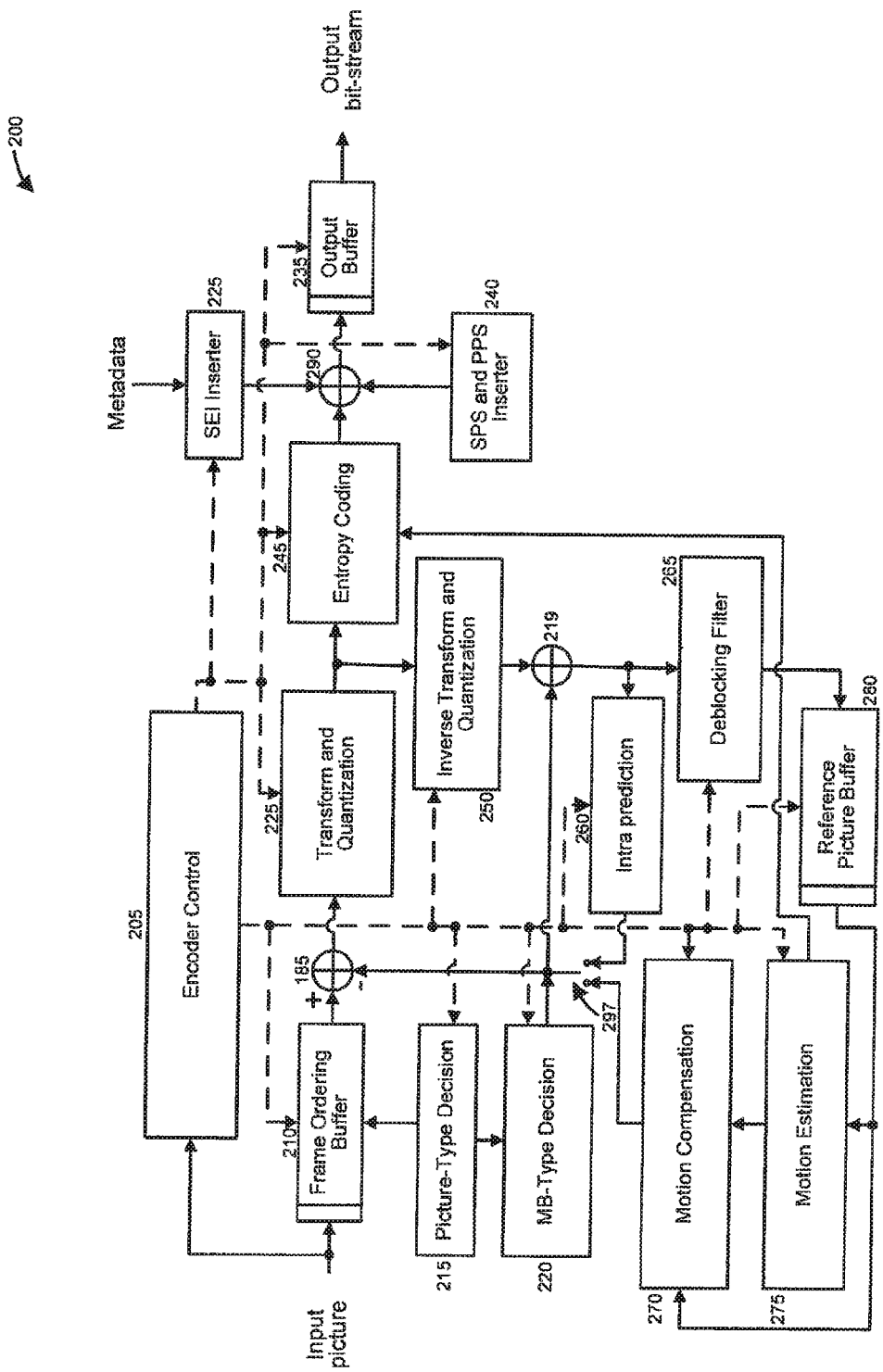
FIG. 2 is a block diagram showing an exemplary video encoder to which the present principles may be applied, in accordance with an embodiment of the present principles.

Turning to FIG. 2, an exemplary video encoder to which the present principles may be applied is indicated generally by the reference numeral 200. The video encoder 200 includes a frame ordering buffer 210 having an output in signal communication with a non-inverting input of a combiner 285. An output of the combiner 285 is connected in signal communication with a first input of a transformer and quantizer 225. An output of the transformer and quantizer 225 is connected in signal communication with a first input of an entropy coder 245 and a first input of an inverse transformer and inverse quantizer 250. An output of the entropy coder 245 is connected in signal communication with a first non-inverting input of a combiner 290. An output of the combiner 190 is connected in signal communication with a first input of an output buffer 235.

A first output of an encoder controller 205 is connected in signal communication with a second input of the frame ordering buffer 210, a second input of the inverse transformer and inverse quantizer 250, an input of a picture-type decision module 215, a first input of a macroblock-type (MB-type) decision module 220, a second input of an intra prediction module 260, a second input of a deblocking filter 265, a first input of a motion compensator 270, a first input of a motion estimator 275, and a second input of a reference picture buffer 280.

A second output of the encoder controller 205 is connected in signal communication with a first input of a Supplemental Enhancement Information (SEI) inserter 230, a second input of the transformer and quantizer 225, a second input of the entropy coder 245, a second input of the output buffer 235, and an input of the Sequence Parameter Set (SPS) and Picture Parameter Set (PPS) inserter 240.

An output of the SEI inserter 230 is connected in signal communication with a second non-inverting input of the combiner 290.

A first output of the picture-type decision module 215 is connected in signal communication with a third input of the frame ordering buffer 210. A second output of the picture-type decision module 215 is connected in signal communication with a second input of a macroblock-type decision module 220.

An output of the Sequence Parameter Set (SPS) and Picture Parameter Set (PPS) inserter 240 is connected in signal communication with a third non-inverting input of the combiner 290.

An output of the inverse quantizer and inverse transformer 250 is connected in signal communication with a first non-inverting input of a combiner 219. An output of the combiner 219 is connected in signal communication with a first input of the intra prediction module 260 and a first input of the deblocking filter 265. An output of the deblocking filter 265 is connected in signal communication with a first input of a reference picture buffer 280. An output of the reference picture buffer 280 is connected in signal communication with a second input of the motion estimator 275 and a third input of the motion compensator 270. A first output of the motion estimator 275 is connected in signal communication with a second input of the motion compensator 270. A second output of the motion estimator 275 is connected in signal communication with a third input of the entropy coder 245.

An output of the motion compensator 270 is connected in signal communication with a first input of a switch 297. An output of the intra prediction module 260 is connected in signal communication with a second input of the switch 297. An output of the macroblock-type decision module 220 is connected in signal communication with a third input of the switch 297. The third input of the switch 297 determines whether or not the "data" input of the switch (as compared to the control input, i.e., the third input) is to be provided by the motion compensator 270 or the intra prediction module 260. The output of the switch 297 is connected in signal communication with a second non-inverting input of the combiner 219 and an inverting input of the combiner 285.

A first input of the frame ordering buffer 210 and an input of the encoder controller 205 are available as inputs of the encoder 200, for receiving an input picture. Moreover, a second input of the Supplemental Enhancement Information (SEI) inserter 230 is available as an input of the encoder 200, for receiving metadata. An output of the output buffer 235 is available as an output of the encoder 200, for outputting a bitstream.

Figure 3:
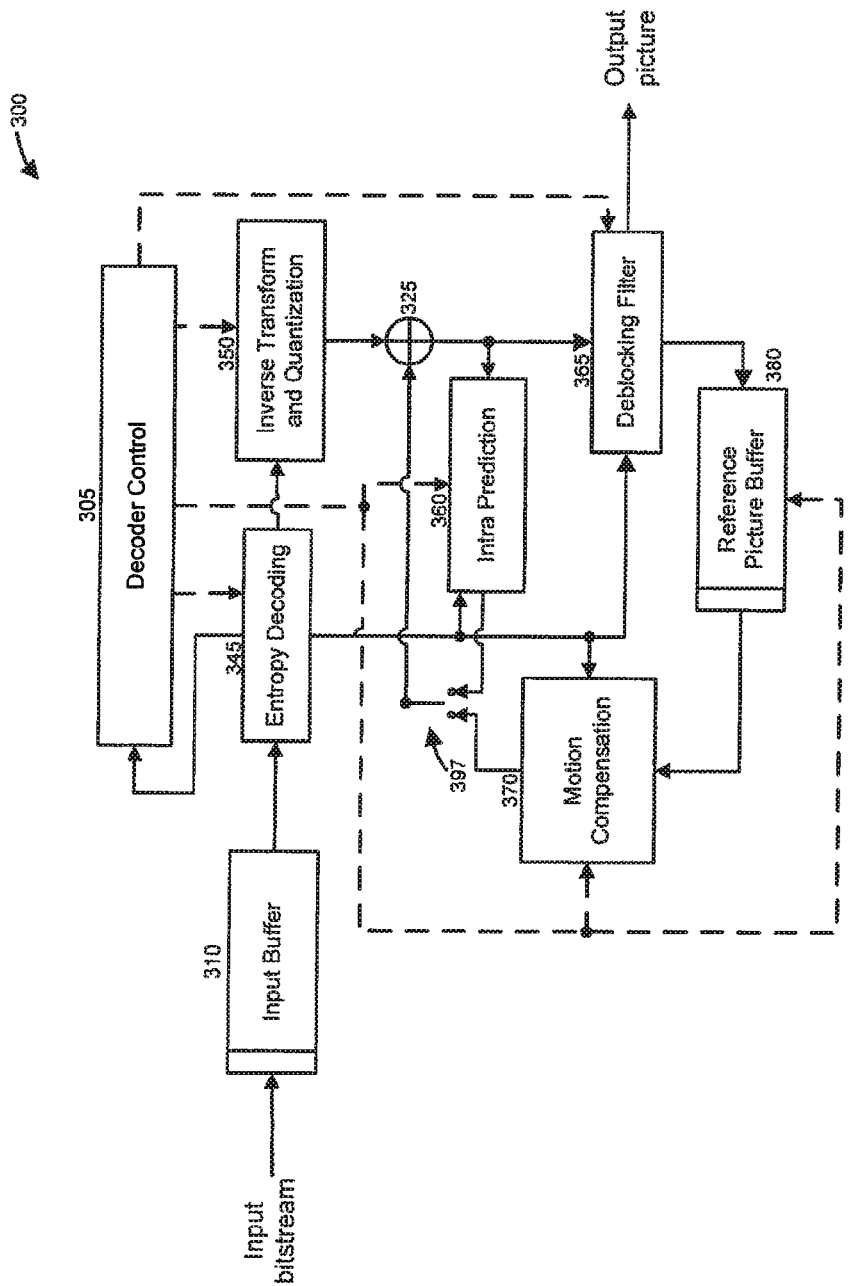
FIG. 3 is a block diagram showing an exemplary video decoder to which the present principles may be applied, in accordance with an embodiment of the present principles.

Turning to FIG. 3, an exemplary video decoder to which the present principles may be applied is indicated generally by the reference numeral 300. The video decoder 300 includes an input buffer 310 having an output connected in signal communication with a first input of an entropy decoder 345. A first output of the entropy decoder 345 is connected in signal communication with a first input of an inverse transformer and inverse quantizer 350. An output of the inverse transformer and inverse quantizer 350 is connected in signal communication with a second non-inverting input of a combiner 325. An output of the combiner 325 is connected in signal communication with a second input of a deblocking filter 365 and a first input of an intra prediction module 360. A second output of the deblocking filter 365 is connected in signal communication with a first input of a reference picture buffer 380. An output of the reference picture buffer 380 is connected in signal communication with a second input of a motion compensator 370.

A second output of the entropy decoder 345 is connected in signal communication with a third input of the motion compensator 370, a first input of the deblocking filter 365, and a third input of the intra predictor 360. A third output of the entropy decoder 345 is connected in signal communication with an input of a decoder controller 305. A first output of the decoder controller 305 is connected in signal communication with a second input of the entropy decoder 345. A second output of the decoder controller 305 is connected in signal communication with a second input of the inverse transformer and inverse quantizer 350. A third output of the decoder controller 305 is connected in signal communication with a third input of the deblocking filter 365. A fourth output of the decoder controller 305 is connected in signal communication with a second input of the intra prediction module 360, a first input of the motion compensator 370, and a second input of the reference picture buffer 380.

An output of the motion compensator 370 is connected in signal communication with a first input of a switch 397. An output of the intra prediction module 360 is connected in signal communication with a second input of the switch 397. An output of the switch 397 is connected in signal communication with a first non-inverting input of the combiner 325.

An input of the input buffer 310 is available as an input of the decoder 300, for receiving an input bitstream. A first output of the deblocking filter 365 is available as an output of the decoder 300, for outputting an output picture.

As noted above, the present principles are directed to methods and apparatus for example-based data pruning using intra-frame patch similarity.

In accordance with the present principles, this application discloses a new approach that takes advantage of patch similarity within a video frame. The patch similarity within an image happens in many real-world pictures where there are repetitive textures or patterns in the pictures such as, for example, a picture with wall papers as the background. The within-picture patch similarity is discovered by a clustering algorithm, and a patch library is created for pruning and recovery. However, since the same frame is used for both creating patch library and for pruning/recovery, the patch dependency problems have to be resolved in order to ensure artifact-free recovery.

The present principles provide an improvement of our previous approach by training the patch library at the decoder side using previously sent frames or existing frames, rather than sending the patch library through one or more communication channels. Moreover, the data pruning is realized by replacing some blocks in the input frames with flat regions to create "mixed-resolution" frames.

As noted above, in the MPEG-4 AVC Standard, intra-frame block prediction is realized by block prediction from the neighboring blocks. However, long-range similarity of non-neighboring blocks is not exploited to increase compression efficiency. Advantageously, the present principles provide a method for pruning an input video so that the input video can be more efficiently encoded by a video encoder. The present principles take advantage of the similarity of image patches within a video frame to further increase the compression efficiency.

In accordance with the present principles, intra-frame patch similarity is used to train an example patch library and prune a video and recover the pruned video. Error-bounded clustering (the modified K-means clustering) is used for efficient patch searching in the library. To improve compression efficiency, a mixed-resolution data pruning scheme is used, where blocks are replaced by flat blocks to reduce the high-frequency signal.

The present principles may involve the use of patch signature matching, a matching rank list, and rank number encoding to increase the efficiency of metadata (best-match patch position in library) encoding. Moreover, a method is disclosed for encoding the block coordinates using the flat block identification based on color variation.

Referring back to FIG. 1, one difference between the present principles and the aforementioned first approach is that the input video frame for pruning is also used for patch library creation. In the pruning system 100, the encoder-side processing component can be considered to include two parts, namely a patch library creation part and a pruning part. For the encoder side, two patch libraries are generated at the encoder side, one patch library from the original frame, the other patch library from the reconstructed frame (i.e., a pruned, encoded and then decoded frame). The latter is exactly the same as the patch library created at the encoder side in that they use exactly the same frame (i.e., the reconstructed frame) to generate the patch libraries. At the encoder side, the patch library created using the original frame is used to prune the blocks, whereas the patch library created using the reconstructed frame is used to encode metadata. The reason of using a patch library created from the reconstructed frame is to make sure the patch libraries for encoding and decoding metadata are identical at the encoder and decoder side. For the patch library created using the original frames, a clustering algorithm is performed to group the patches so that the patch search process during pruning can be efficiently carried out. Pruning is a process to modify the source video using the patch library so that less bits are sent to the decoder side. Pruning is realized by dividing a video frame into blocks, and replacing some of the blocks with flat blocks. The pruned frame is then taken as the input for a video encoder. An example video encoder to which the present principles may be applied is shown in FIG. 2 described above.

Referring back to FIG. 1, the decoder-side processing component of the pruning system 100 can also be considered to include two parts, namely a patch library creation part and a recovery part. Patch library creation is a process to create a patch library that is exactly the same as the library used for pruning at the encoder side. This is ensured by using exactly the same frame (i.e., the reconstructed pruned frame) for patch library creation. The recovery component is a process to recover the pruned content in the decoded pruned frames sent from the encoder side. An example video encoder to which the present principles may be applied is shown in FIG. 3 described above.

Patch Library Creation

Figure 4:
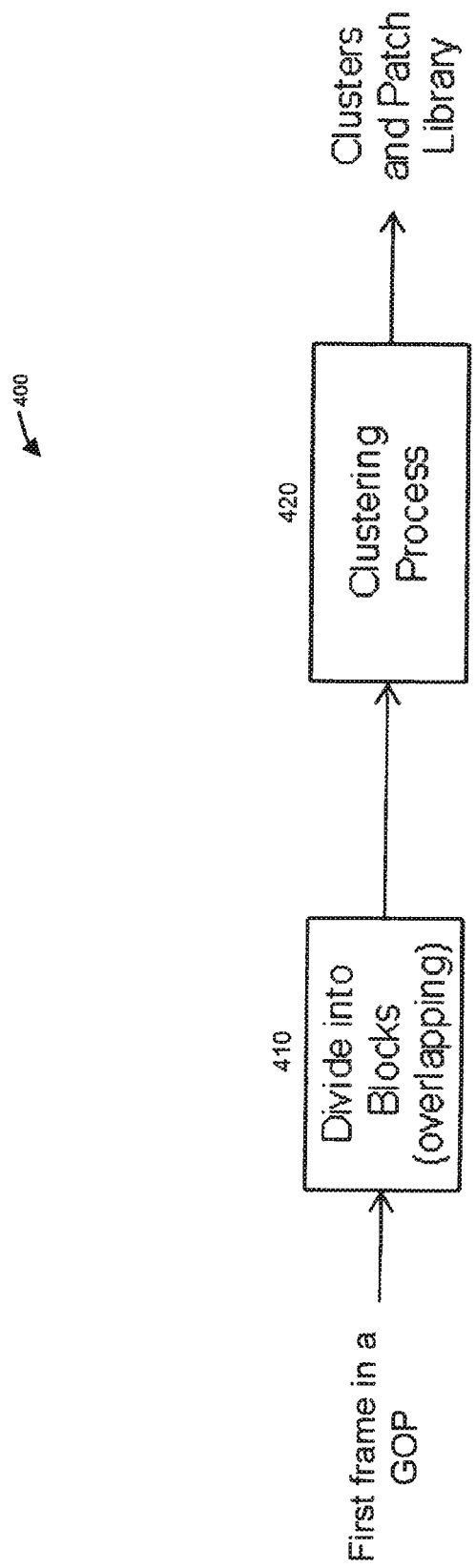
FIG. 4 is a block diagram showing an exemplary first portion for performing encoder side processing in an example-based data pruning system using intra-frame patch similarity, in accordance with an embodiment of the present principles.

Turning to FIG. 4, an exemplary first portion for performing encoder side processing in an example-based data pruning system using intra-frame patch similarity is indicated generally by the reference numeral 400. The first portion 400 includes a divider 410 having an output in signal communication with an input of a clustering device 420. An input of the divider is available as an input to the first portion 400, for receiving the first frame in a GOP. An output of the clustering device 420 is available as an output of the first portion 400, for outputting clusters and a patch library.

Figure 5:
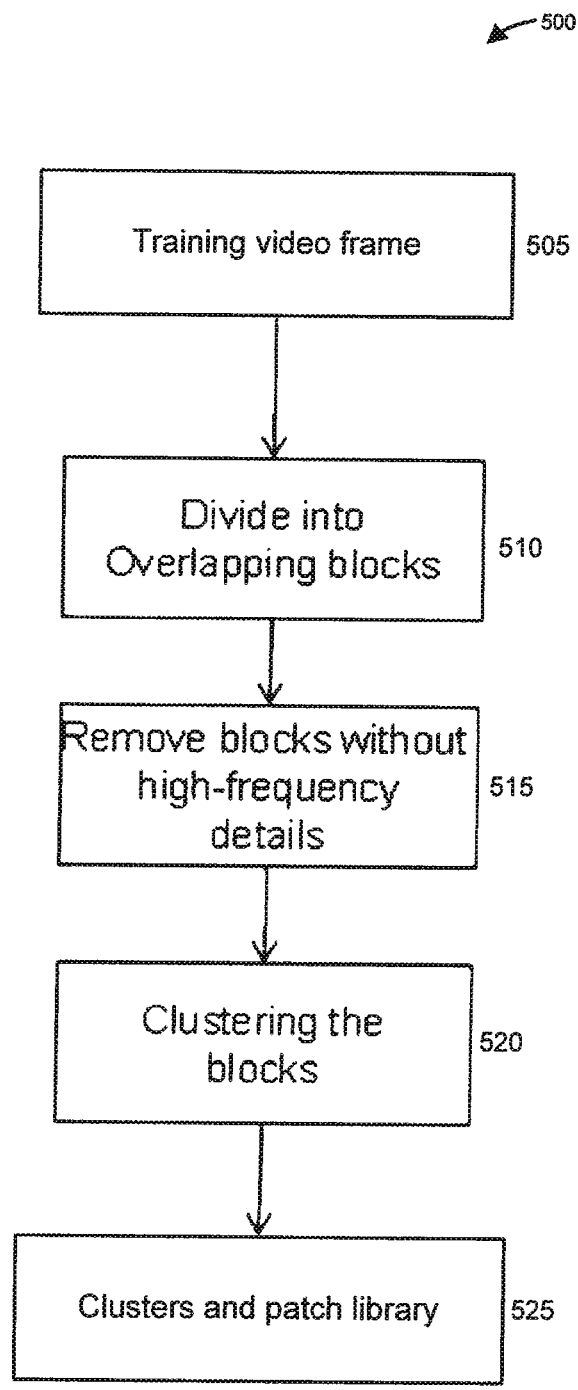
FIG. 5 is a block diagram showing an exemplary method for clustering and patch library creation, in accordance with an embodiment of the present principles.

Turning to FIG. 5, an exemplary method for clustering and patch library creation is indicated generally by the reference numeral 500. At step 505, a training video frame is input. At step 510, the training video frame is divided (by divider 410) into overlapping blocks. At step 515, blocks without high-frequency details are removed (by the clustering device 420). At step 520, the blocks are clustered (by the clustering device 420). At step 525, clusters and a patch library are output.

Figure 6:
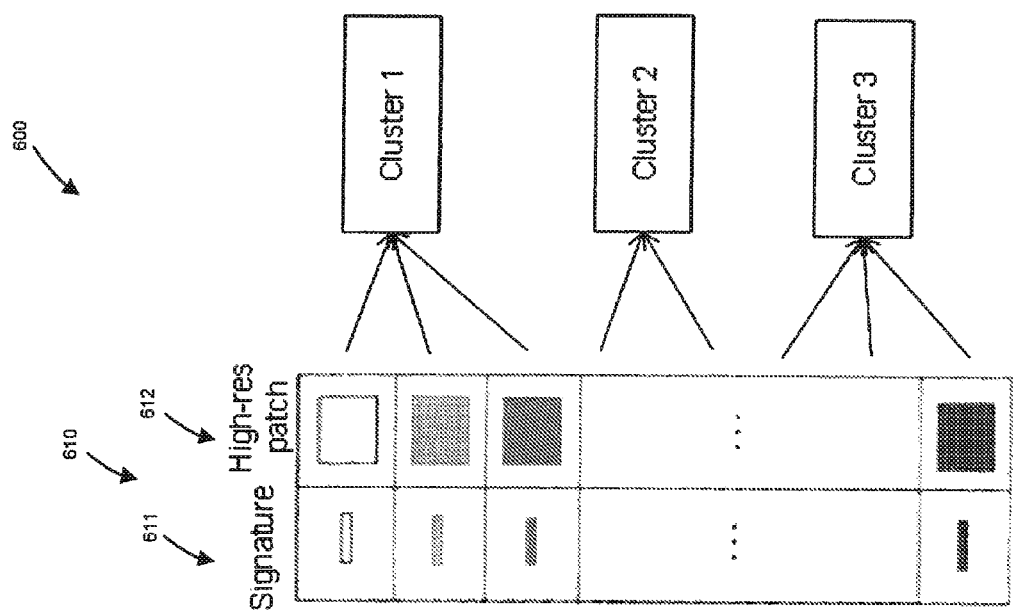
FIG. 6 is a block diagram showing an exemplary patch library and corresponding clusters, in accordance with an embodiment of the present principles.

The patch library is a pool of high resolution patches that can be used to recover pruned image blocks. Turning to FIG. 6, an exemplary patch library and corresponding clusters are indicated generally by the reference numeral 600. The patch library is specifically indicated by the reference numeral 610, and includes a signature portion 611 and a high resolution patch portion 612. For the encoder side processing, two patch libraries are generated, one patch library for pruning, the other patch library for metadata encoding. The patch library for pruning is generated using the original frame, whereas the patch library for metadata encoding is generated using the reconstructed frame. For the patch library for pruning, the patches in the library are grouped into clusters so that the pruning search process can be efficiently performed. The video frames used for library creation are divided into overlapping blocks to form a training data set. The training data is first cleaned up by removing all blocks that do not include high-frequency details. A modified K-means clustering algorithm is used to group the patches in the training data set into clusters. For each cluster, the cluster center is the average of the patches in the cluster, and is used for matching to an incoming query during the pruning process. The modified K-means clustering algorithm guarantees that the error between any patch within a cluster and its cluster center is smaller than a specified threshold. The modified K-means clustering algorithm could be replaced by any similar clustering algorithm which ensures the error bound in the clusters.

To speed up computation, the horizontal and vertical dimensions of the training frames are reduced to one quarter of the original size. Also, the clustering process is performed on the patches in the downsized frames. In one exemplary embodiment, the size of the high-resolution patches is 16×16 pixels, and the size of the downsized patches is 4×4 pixels. Therefore, the downsize factor is 4. Of course, other sizes can be used, while maintaining the spirit of the present principles.

For the patch library for metadata encoding, the clustering process and clean-up process are not performed, therefore it includes all possible patches from the reconstructed frame. However, for every patch in the patch library created from the original frames, its corresponding patch can be found in the patch library created from the reconstructed frame using the coordinates of the patches. This would make sure that metadata encoding can be correctly performed. For the decoder side, the same patch library without clustering is created using the same decoded video frames for metadata decoding and pruned block recovery.

Figure 7:
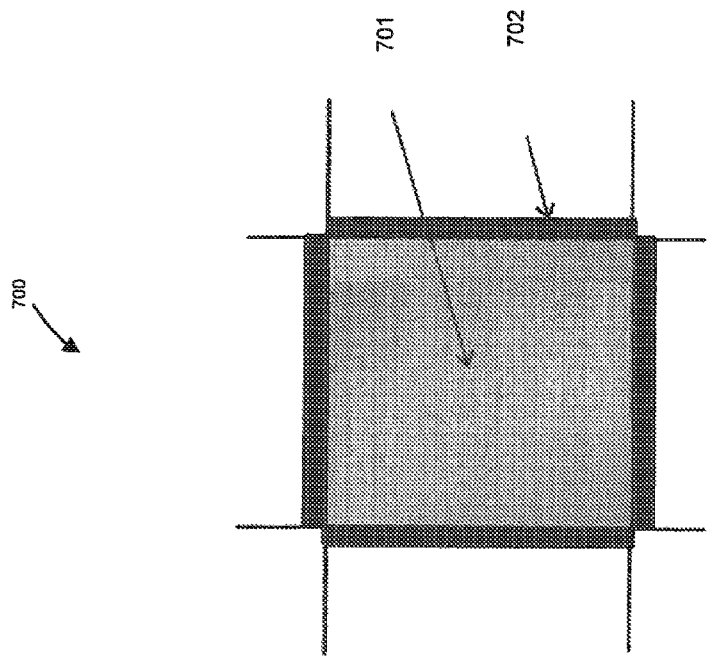
FIG. 7 is a diagram showing an exemplary signature vector, in accordance with an embodiment of the present principles.

For the patch libraries created using decoded frames at both the encoder and decoder side, another process is conducted to create the signatures of the patches. The signature of a patch is a feature vector that includes the average color of the patch and the surrounding pixels of the patch. The patch signatures are used for the metadata encoding process to more efficiently encode the metadata, and used in the recovery process at the decoder side to find the best-match patch and more reliably recover the pruned content. Turning to FIG. 7, an exemplary signature vector is indicated generally by the reference numeral 700. The signature vector 700 includes an average color 701 and surrounding pixels 702.

The metadata encoding process is described herein below. In the pruned frame, sometimes the neighboring blocks of a pruned block for recovery or metadata encoding are also pruned. Then the set of surrounding pixels used as the signature for search in the patch library only includes the pixels from the non-pruned blocks. If all the neighboring blocks are pruned, then only the average color 701 is used as the signature. This may end up with bad patch matches since too little information is used for patch matching, that is why neighboring non-pruned pixels 702 are important.

Pruning Process

Similar to standard video encoding algorithms, the input video frames are divided into Group of Pictures (GOP). The pruning process is conducted on the first frame of a GOP. The pruning result is propagated to the rest of the frames in the GOP afterwards.

Pruning Process for the First Frame in a GOP

Figure 8:
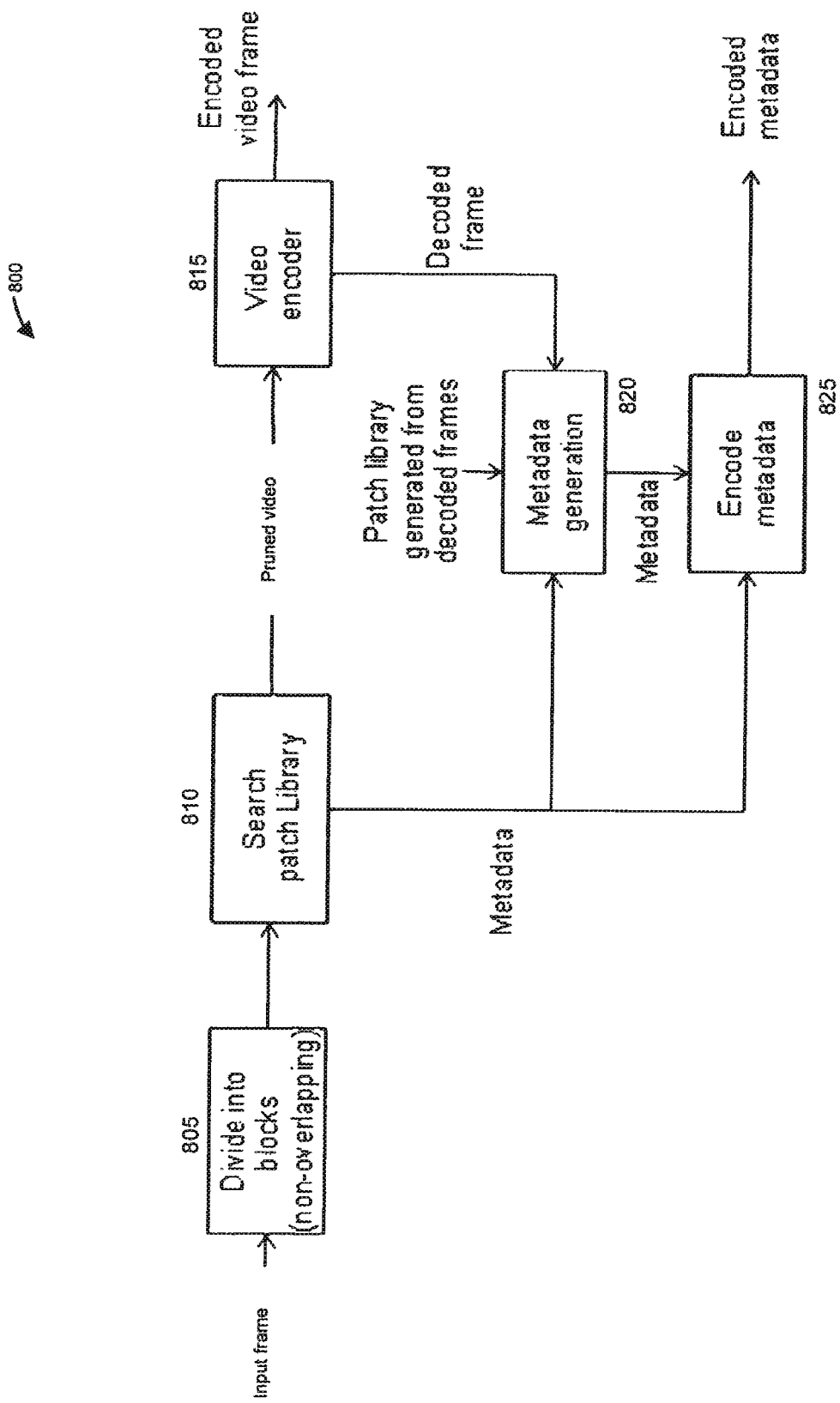
FIG. 8 is a block diagram showing an exemplary second portion for performing encoder side processing in an example-based data pruning system using intra-frame patch similarity, in accordance with an embodiment of the present principles.

Turning to FIG. 8, an exemplary second portion for performing encoder side processing in an example-based data pruning system using intra-frame patch similarity is indicated generally by the reference numeral 800. The second portion 800 includes a divider 805 having an output in signal communication with an input of a patch library searcher 810. An output of the patch library searcher 810 is connected in signal communication with an input of a video encoder 815, a first input of a metadata generator 830, and a first input of a metadata encoder 825. An output of the metadata generator 830 is connected in signal communication with a second input of the metadata encoder 825. A first output of the video encoder 815 is connected in signal communication with a second input of the metadata generator 830. An input of the divider 805 is available as an input of the second portion 800, for receiving an input frame. An output of the video encoder 815 is available as an output of the second portion 800, for outputting an encoded video frame. An output of the metadata encoder 825 is available as an output of the second portion 800, for outputting encoded metadata.

Figure 9:
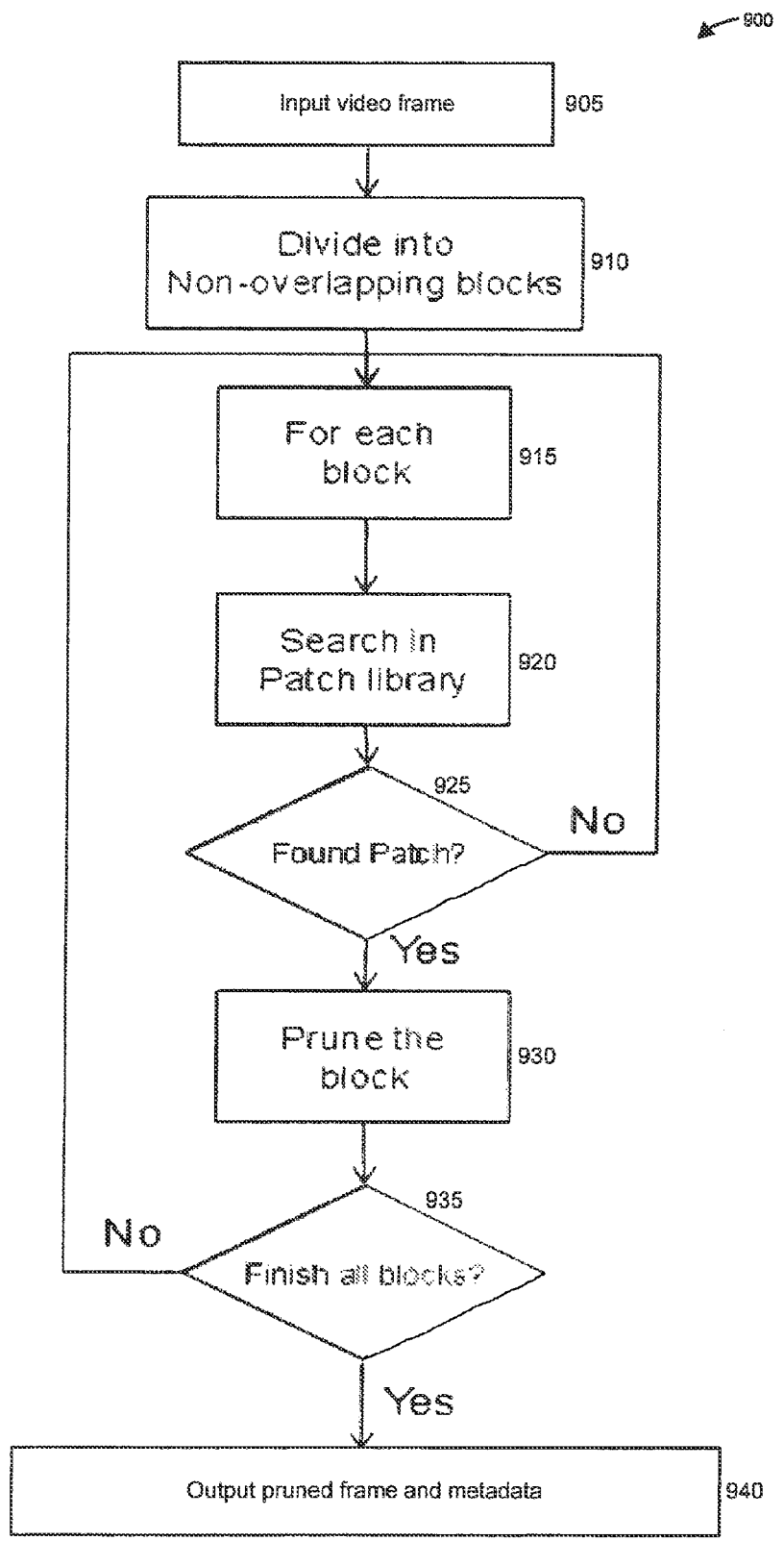
FIG. 9 is a flow diagram showing an exemplary method for video frame pruning, in accordance with an embodiment of the present principles.

Turning to FIG. 9, an exemplary method for pruning a video frame is indicated generally by the reference numeral 900. At step 905, a video frame is input. At step 910, the video frame is divided into non-overlapping blocks. At step 915, a loop is performed for each block. At step 920, a search is performed in the patch library. At step 925, it is determined whether or not a patch has been found. If so, then the method proceeds to step 930. Otherwise, the method returns to step 915. At step 930, the block is pruned. At step 935, it is determined whether or not all blocks have been finished. If so, then the method proceeds to step 940. Otherwise, the method returns to step 915. At step 940, the pruned frame and corresponding metadata are output.

Figure 10:
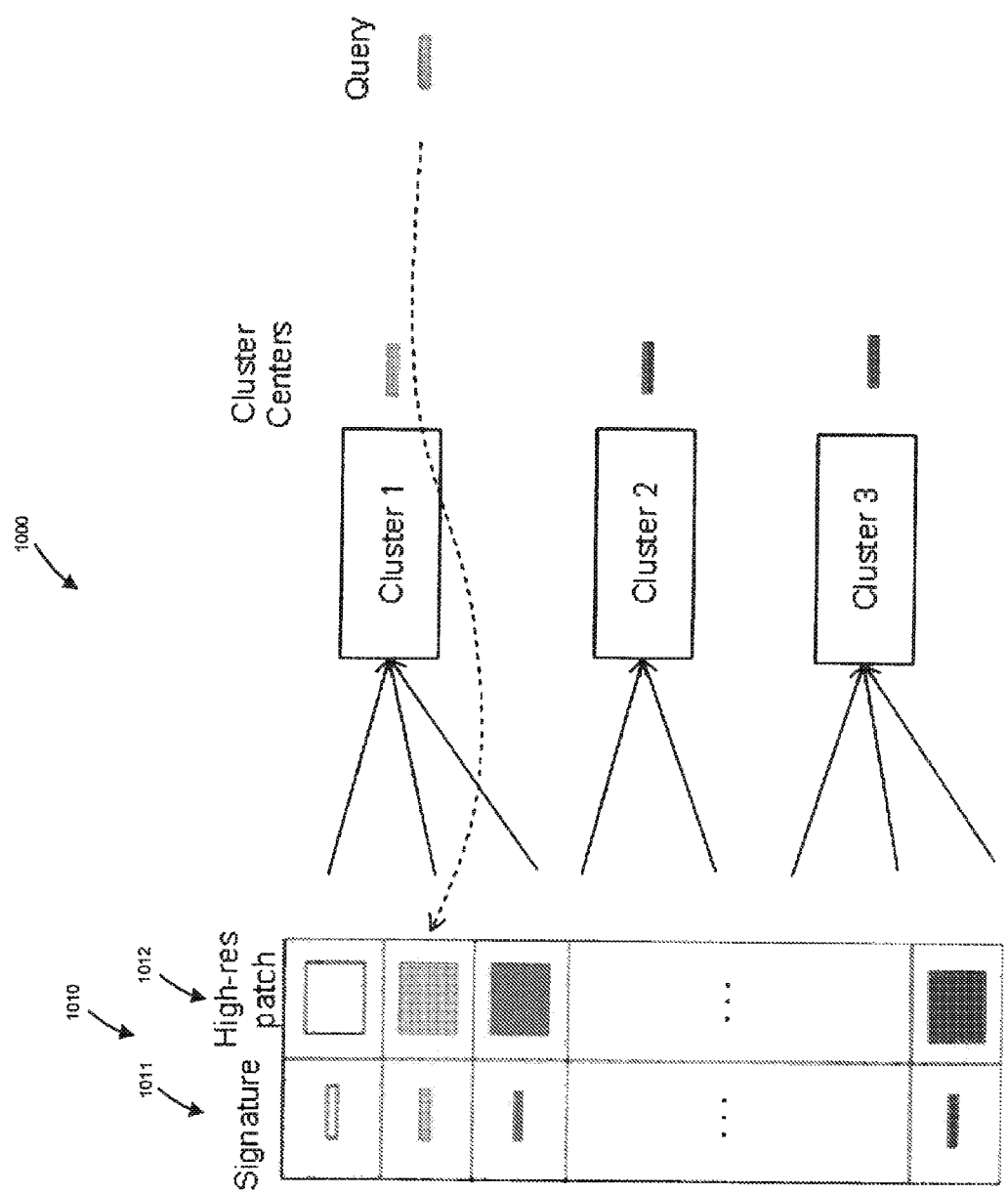
FIG. 10 is a block diagram showing a patch search process, in accordance with an embodiment of the present principles.

Thus, the input frame is first divided into non-overlapping blocks per step 910. The size of the block is the same as the size of the macroblock used in the standard compression algorithms, in our current implementation, 16×16 pixels. A search process then is followed to find the best-match patch in the patch library per step 920. This search process is illustrated in FIG. 10. Turning to FIG. 10, a patch search process performing during pruning is indicated generally by the reference numeral 1000. The patch search process 1000 involves a patch library 1010 which, in turn, includes a signature portion 1011 and a high resolution patch portion 1012. First, the block is matched with the centers of the clusters by calculating the Euclidean distance, and finding the top K matched clusters. Currently, K is determined empirically. In principle, K is determined by the error bound of the clusters. Of course, other approaches to calculating K may also be used in accordance with the teachings of the present principles. After the candidate clusters are indentified, the search process is conducted within the clusters until the best-match patch is found in the clusters. If the difference between the best-match patch and the query block is sufficiently small, the block would be pruned. Otherwise, the block will be kept intact.

The preceding approach is different from the aforementioned first approach, since in the first approach the patches in the input frames are used to create patch library and recover the pruned blocks, thus resulting in block dependency problem, meaning that the needed patches for recovery may not be available when a block is being recovered. This problem is solved by following two solutions provided by the present principles: pruning with causal recovery; and pruning using a dependency graph.

a) Pruning for Causal Recovery

Figure 11:
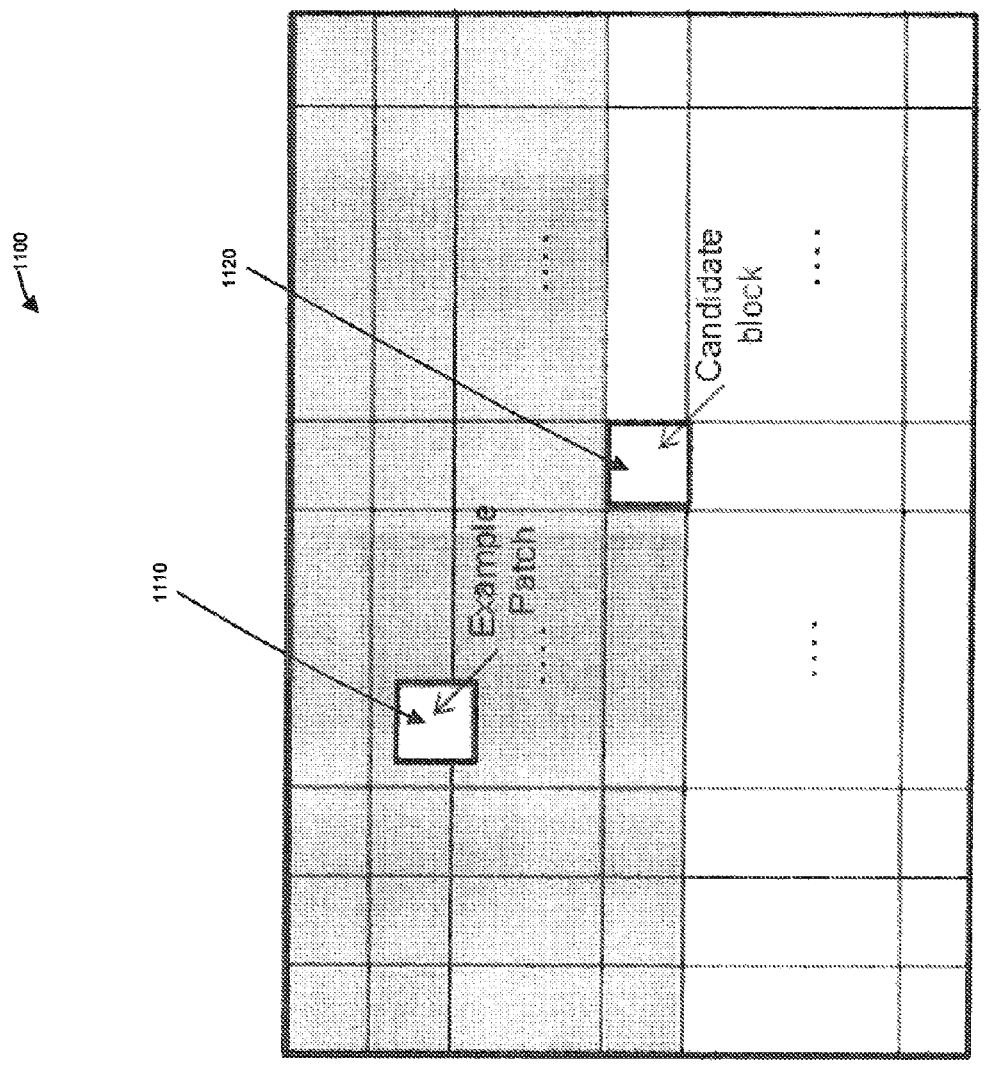
FIG. 11 is a diagram showing a block search area in a process of pruning for causal recovery, in accordance with an embodiment of the present principles.

In the case of pruning with causal recovery, for a pruned block, the search process (also the recovery process at the decoder side) will only look at the patches preceding the pruned block in the coordinates in the patch library. Turning to FIG. 11, a block search area in a process of pruning for causal recovery is indicated generally by the reference numeral 1100. The block search area 1100 includes an example patch 1110 and a candidate block 1120. The patches preceding the pruning block (the candidate block 1120) are within the shaded area in FIG. 11. In recovery, by the time the pruned block 1120 is being recovered, all blocks within the shaded area have been recovered, therefore all patches within the shaded area should be available.

b) Pruning with Dependency Graph

Figure 12:
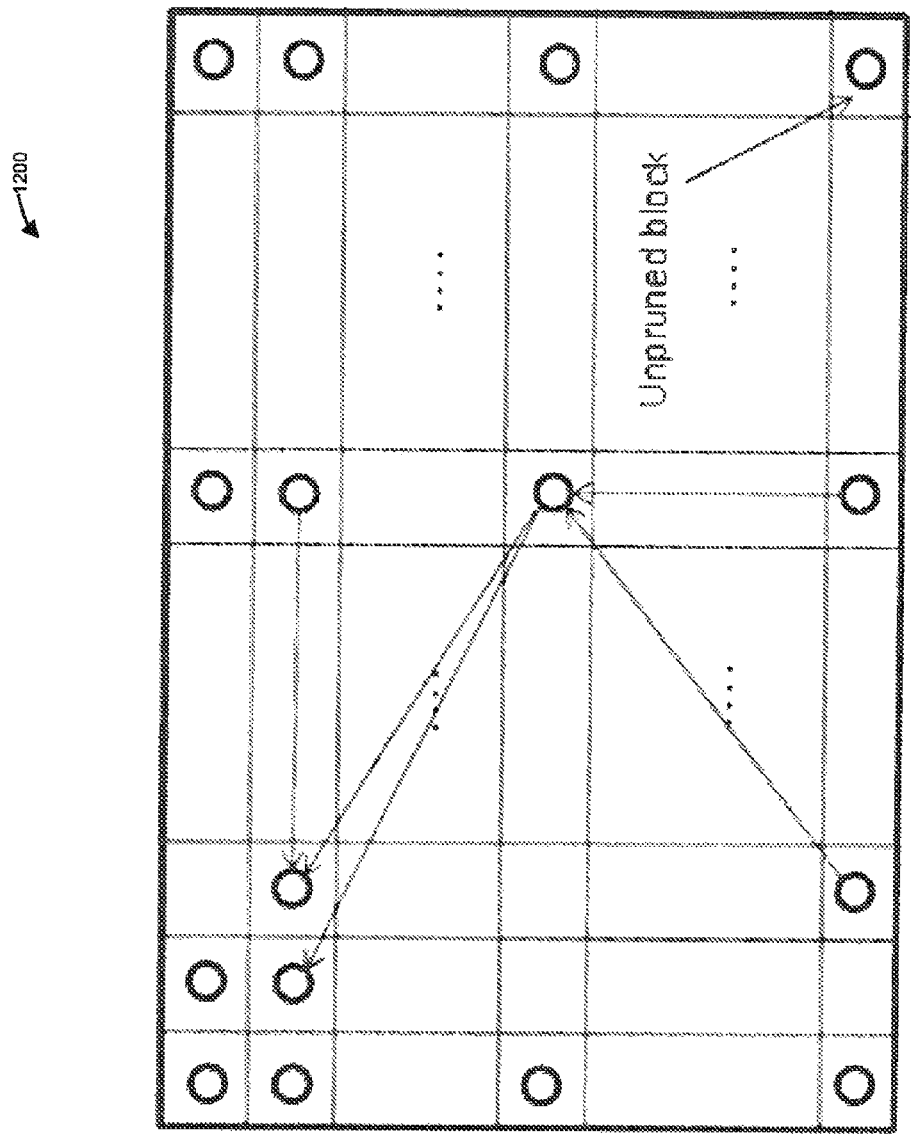
FIG. 12 is a diagram showing an exemplary block dependency graph, in accordance with an embodiment of the present principles.
Figure 13:
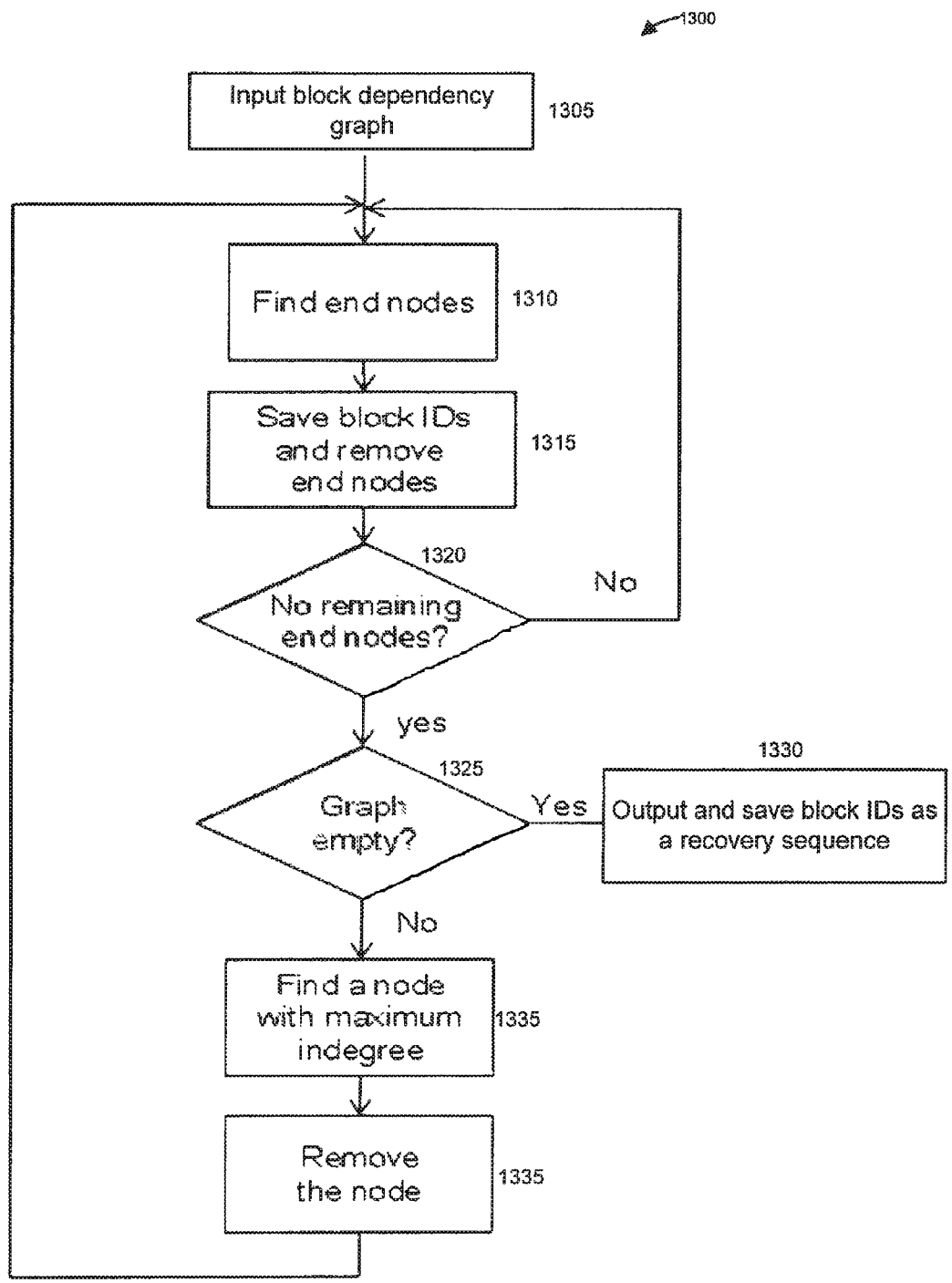
FIG. 13 is a flow diagram showing an exemplary method for obtaining a recovery sequence, in accordance with an embodiment of the present principles.

The limitation of the above approach is that there may be no example patches available for the blocks at the top of a frame. This problem may be solved by a full-frame patch search with the help of a patch dependency graph. The patch dependency graph is a directed acyclic graph (DAG), where each node of the graph represents a candidate block for pruning, and each edge represents the dependency of the blocks. Turning to FIG. 12, an exemplary block dependency graph is indicated generally by the reference numeral 1200. In FIG. 12, each circle is a node of the dependency graph, which represents a block in a video frame. The arrows (edges of the graph) between the circles indicate the dependencies of the blocks. If an arrow starts from one circle and points to another, then the circle that the arrow starts from is dependent on the circle that the arrow points to. If a circle does not have any arrow pointing to any other circle, the corresponding block is an unpruned block that does not need recovery after decoding. The dependency graph 1200 is created during the block search process. For a candidate block, after the block search process, if the best-match patch is found, then an edge that points from the candidate block to the blocks overlapping with the best-match patches would be created in the dependency graph. After the search process is done for all the candidate blocks, a process is carried out to obtain the recovery sequence of the pruned blocks. Turning to FIG. 13, an exemplary method for obtaining a recovery sequence is indicated generally by the reference numeral 1300. At step 1305, a block dependency graph is input. At step 1310, end nodes are found in the block dependency graph. At step 1315, block IDs are saved and end nodes are removed. At step 1320, it is determined whether or not any end nodes remain. If so, then the method proceeds to step 1325. Otherwise, the method returns to step 1310. At step 1325, it is determined whether or not the graph is empty. If so, then the method proceeds to step 1330. Otherwise, the method proceeds to step 1335. At step 1330, the block IDs are output and saved as a recovery sequence. At step 1335, a node with the maximum indegree is found. At step 1340, the node is removed from the block dependency graph.

The method for obtaining a recovery sequence is further described as follows:

1. Find all end nodes (i.e., the nodes that do not depend on other nodes) in the graph and save the corresponding block coordinates (here the block coordinates are represented as the block IDs as shown in FIG. 12) of all the end nodes. After the block IDs are saved, the corresponding nodes are removed from the dependency graph. The procedure repeats until all end nodes are removed. If the dependency graph is empty, the algorithm ends, otherwise the algorithm goes to step (2).

2. Find a node in the graph with maximum indegree, i.e., a node corresponding to the block upon which depends a maximum number of other blocks. Remove the node in the graph, do not save the IDs of the block (i.e., the block will not be pruned). Repeat this procedure until there are new end nodes emerging in the graph. Then the algorithm goes back to step (1). The block is not pruned because the block cannot be recovered using the available pixels (decoded pixels and recovered pixels) in the frame. On the other hand, other blocks may depend on this block to recover. Therefore, in order to prune maximum number of blocks, the block upon which depends the maximum number of other blocks is found. After the block is kept unpruned (i.e., removed from the graph), there may be new end nodes emerging, and then step (1) can be used to prune the block again.

Figure 14:
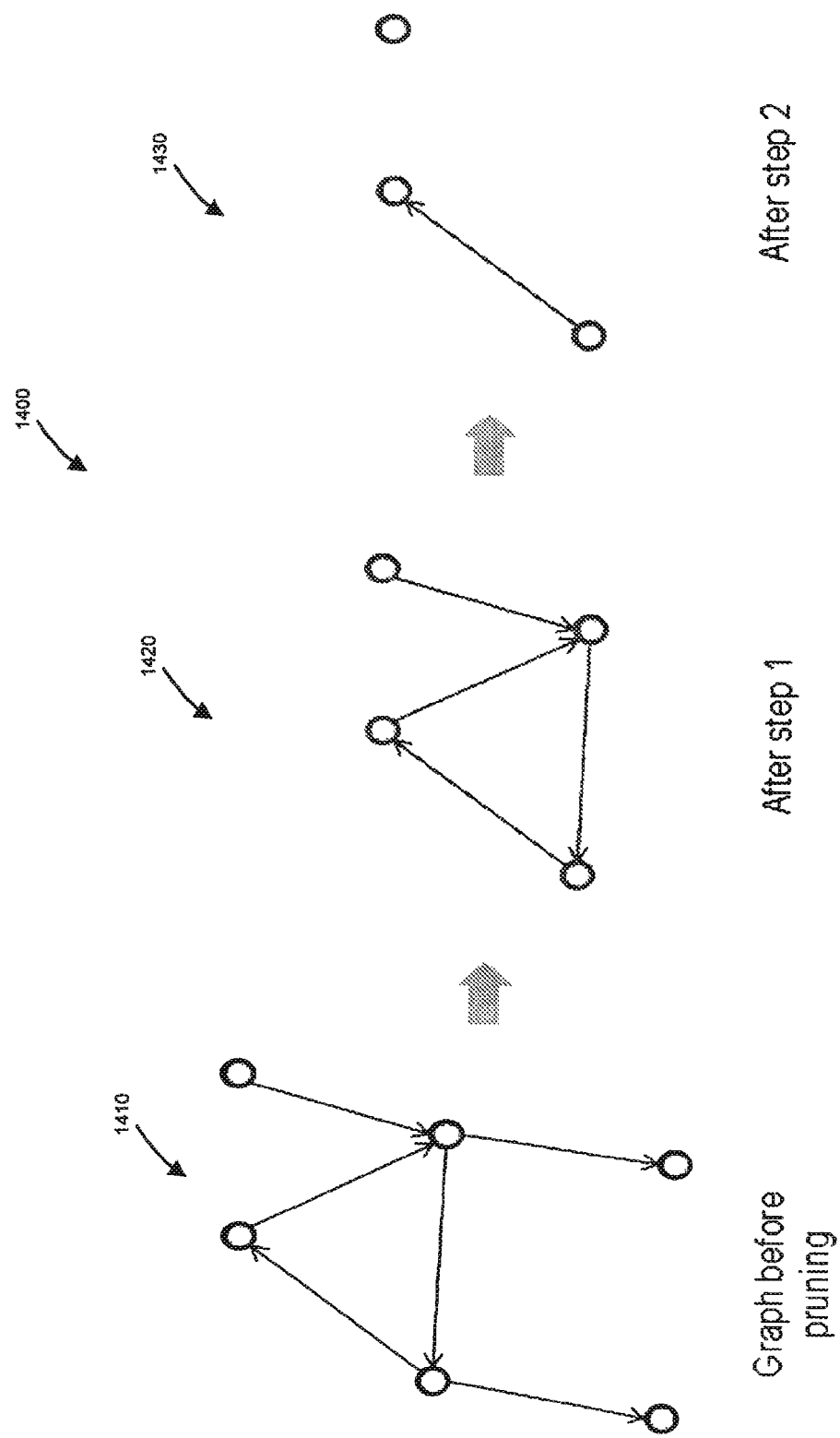
FIG. 14 is a diagram showing an exemplary evolution of the dependency graph using the pruning algorithm, in accordance with an embodiment of the present principles.

Turning to FIG. 14, an exemplary evolution of the dependency graph using the pruning algorithm is indicated generally by the reference numeral 1400. The evolution involves the graph before pruning 1410, the graph after step (1) is performed (1420), and the graph after step (2) is performed (1430).

By using the above algorithm, a block recovery sequence which ensures that the best-matching patch is available will be obtained when a corresponding block is being recovered during the recovery process.

Figure 15:
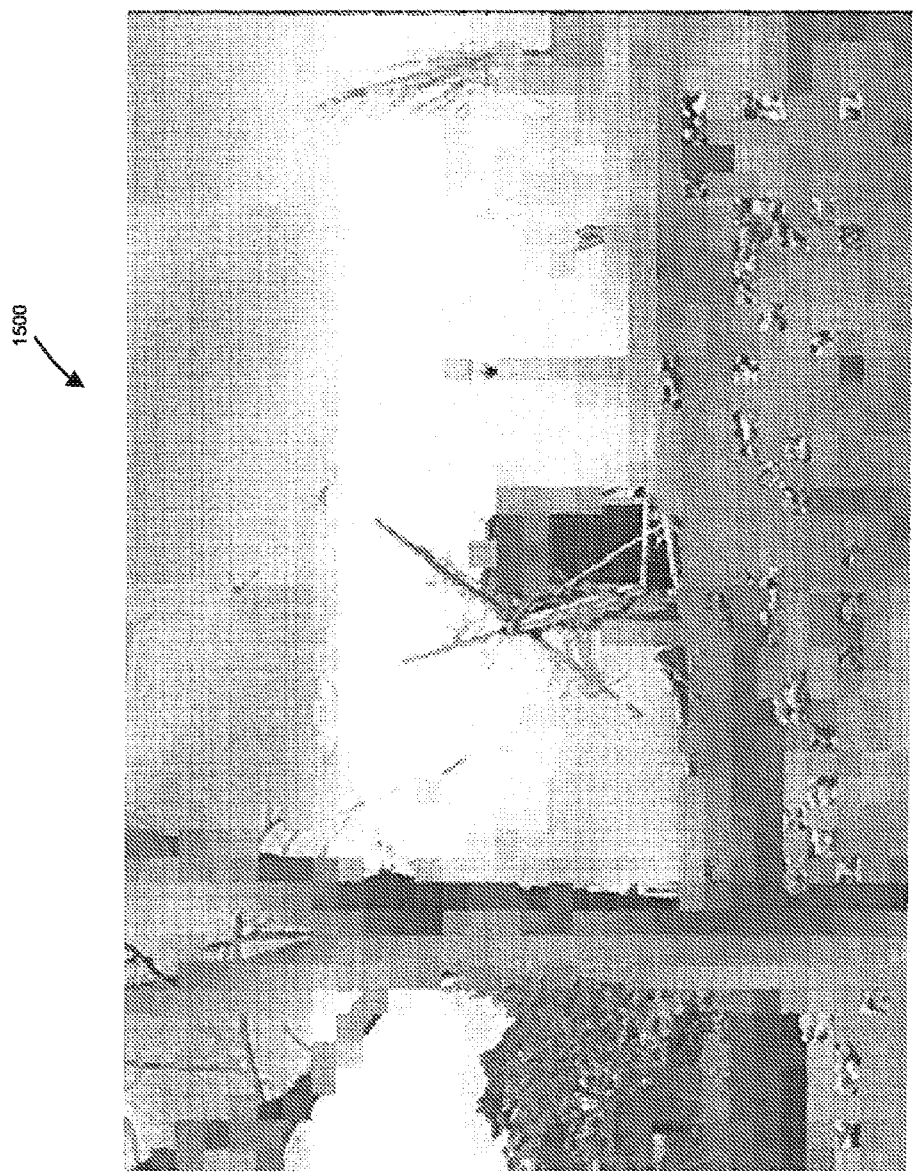
FIG. 15 is a diagram showing an exemplary mixed-resolution frame, in accordance with an embodiment of the present principles.

After the blocks are identified for pruning, a process is conducted to prune the block. There could be different pruning strategies. For example, replacing the high-resolution blocks with low-resolution blocks may be one strategy that is used. However, it is discovered that it is difficult for this approach to achieve significant compression efficiency gain. Therefore, in the current system, a high-resolution block is simply replaced with a flat block, in which all pixels have the same color value, which is the average of the color values of the pixels within the original block. The block replacement process creates a video frame where some parts of the frame have high-resolution and some parts have low-resolution; therefore, such a frame is called as mixed-resolution frame. Turning to FIG. 15, an exemplary mixed-resolution frame is indicated generally by the reference numeral 1500. Our experiments show that such flat-block replacement scheme is quite effective to gain compression efficiency. The flat block replacement scheme could be replaced by a low-resolution block replacement scheme, where the block for pruning is replaced by its low-resolution version.

Metadata Encoding and Decoding

Metadata encoding includes two components (see FIG. 16), one for encoding pruned block IDs (see FIG. 17), the other for encoding patch index (see FIG. 18), which are the results of searching patch library for each block during the pruning process.

Figure 16:
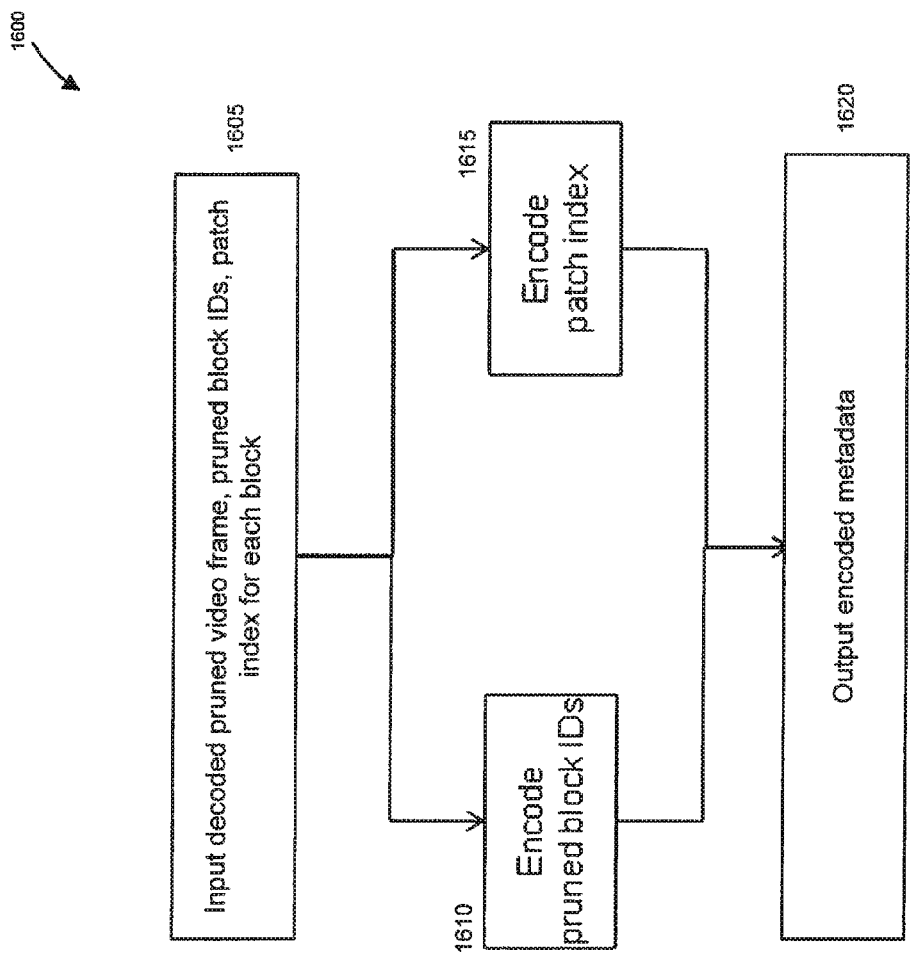
FIG. 16 is a flow diagram showing an exemplary method for encoding metadata, in accordance with an embodiment of the present principles.

Turning to FIG. 16, an exemplary method for encoding metadata is indicated generally by the reference numeral

1600. At step 1605, a decoded pruned video frame, pruned block IDs, and a patch index for each block are input. At step 1610, pruned block IDs are encoded. At step 1615, the patch index is encoded. At step 1620, the encoded metadata is output.

Figure 17:
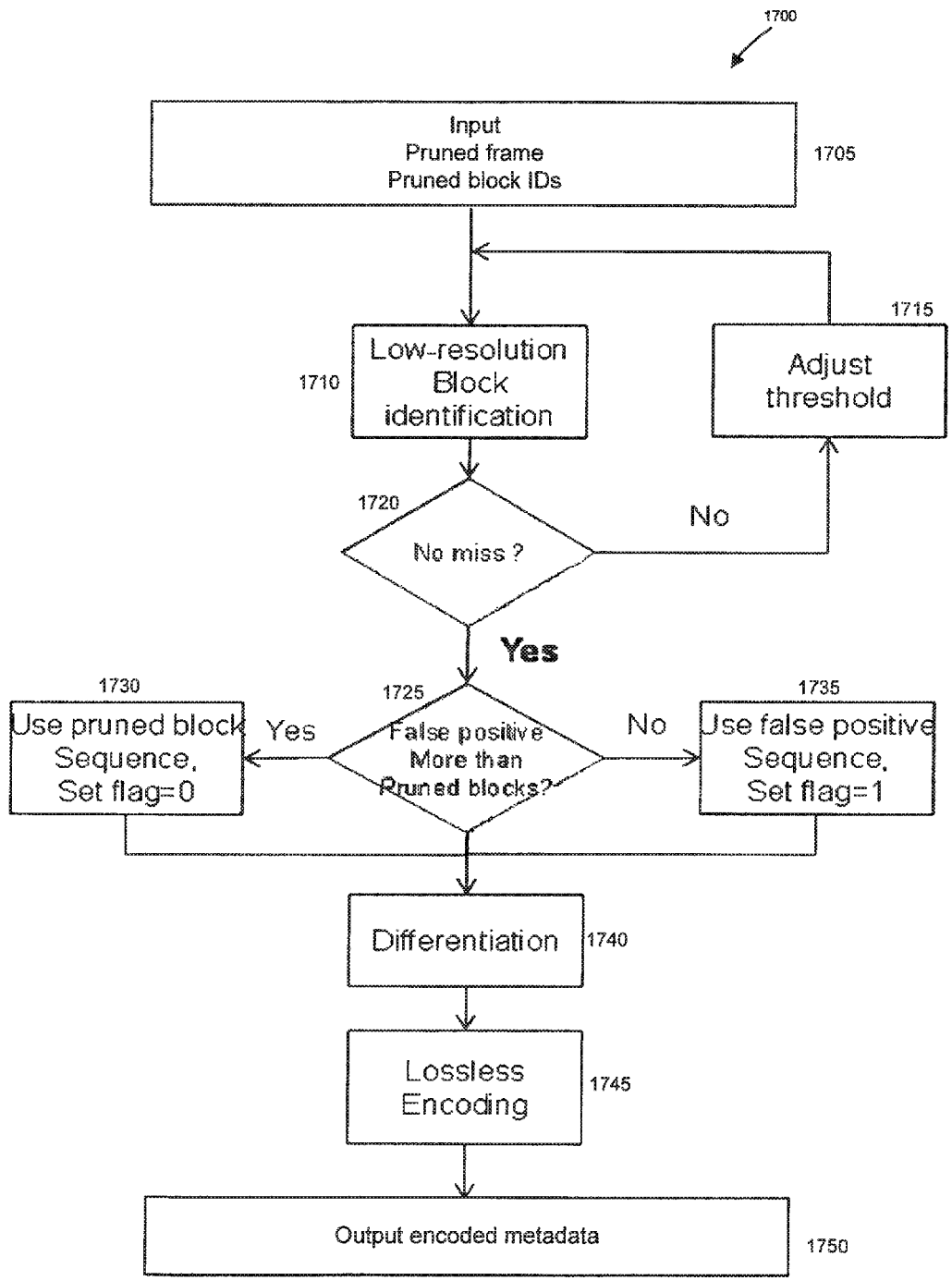
FIG. 17 is a flow diagram showing an example method for encoding pruned block IDs, in accordance with an embodiment of the present principles.

Turning to FIG. 17, an example method for encoding pruned block IDs is indicated generally by the reference numeral 1700. At step 1705, a pruned frame and pruned block IDs are input. At step 1710, a low-resolution block identification is performed. At step 1720, it is determined whether or not there are any misses. If so, then the method proceeds to step 1725. Otherwise, the method proceeds to step 1715. At step 1725, it is determined whether or not the number of false positives is more than the number of pruned blocks. If so, then the method proceeds to step 1630. Otherwise, control proceeds to step 1735. At step 1730, the pruned block sequence is used, and a flag is set equal to zero. At step 1740, a differentiation is performed. At step 1745, lossless encoding is performed. At step 1750, the encoded metadata is output. At step 1715, a threshold is adjusted. At step 1735, the false positive sequence is used, and the flag is set equal to one.

Figure 18:
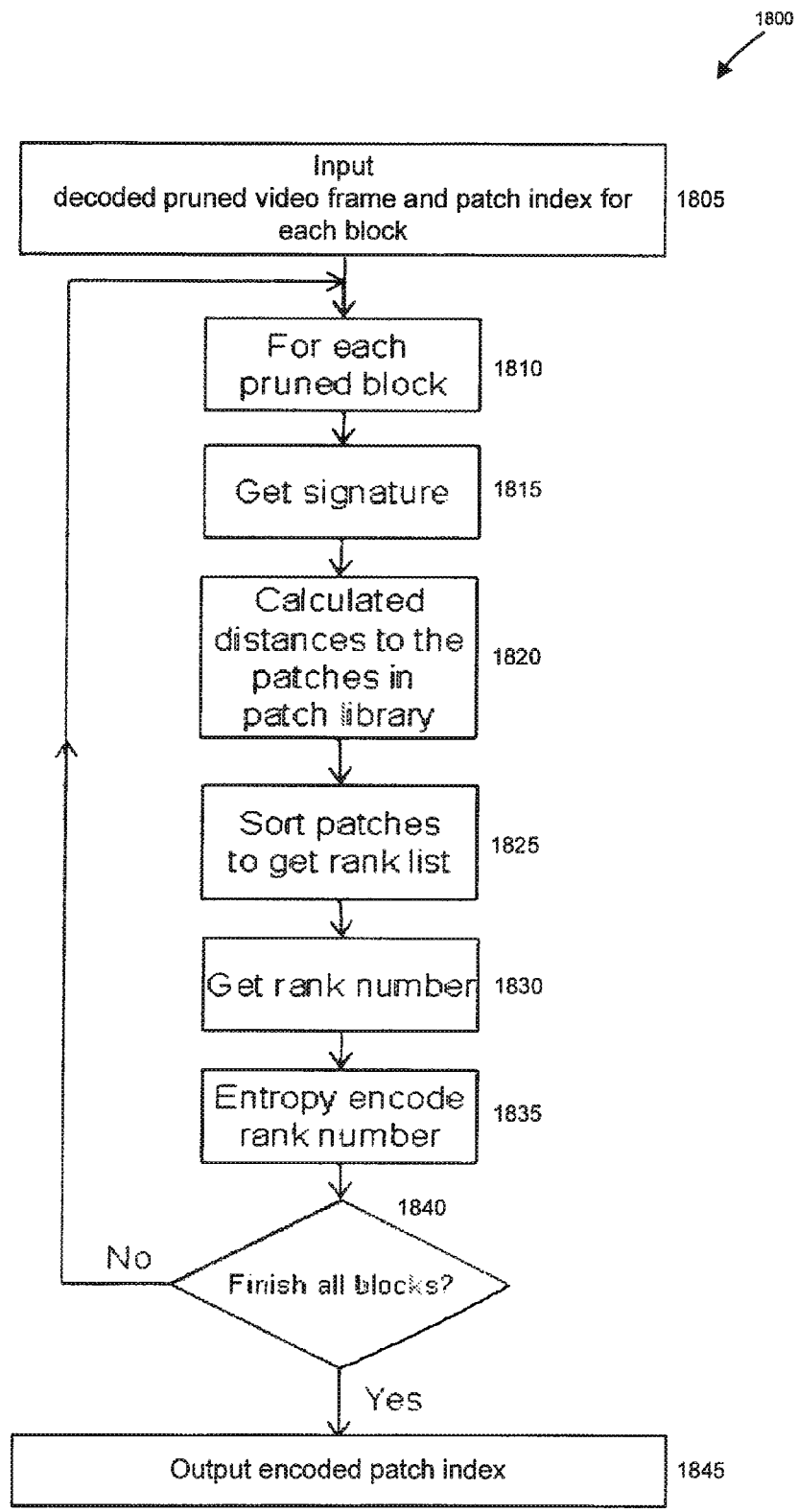
FIG. 18 is a flow diagram showing an exemplary method for encoding a patch index, in accordance with an embodiment of the present principles.

Turning to FIG. 18, an exemplary method for encoding a patch index is indicated generally by the reference numeral 1800. At step 1805, a decoded pruned video frame and a patch index for each block are input. At step 1810, a loop is performed for each pruned block. At step 1815, a signature is obtained. At step 1820, the distances to the patches in the patch library are calculated. At step 1825, the patches are sorted to obtain a rank list. At step 1830, the rank number is obtained. At step 1835, the rank number is entropy coded. At step 1840, it is determined whether or not all blocks are finished (being processed). If so, then the method proceeds to step 1845. Otherwise, the method returns to step 1810. At step 1845, the encoded patch index is output.

During the pruning process, for each block, the system would search the best match patch in the patch library and output a patch index in the patch library for a found patch if the distortion is less than a threshold. Each patch is associated with its signature (i.e., its color plus surrounding pixels in the decoded frames). During the recovery process in the decoder side processing, the color of the pruned block and its surrounding pixels are used as a signature to find the correct high-resolution patch in the library.

However, due to noise, the search process using the signature is not reliable, and metadata is needed to assist the recovery process to ensure reliability. Therefore, after the pruning process, the system will proceed to generate metadata for assisting recovery. For each pruned block, the search process described above already identifies the corresponding patches in the library. The metadata encoding component will simulate the recovery process to encode the metadata. A new patch library will be created using the decoded pruned frame to ensure the patch library is exactly the same as that in the decoder side. The frame is divided into overlapping patches and signatures are created for the patches. During the recovery simulation process, the patch library has to be dynamically updated because some pruned blocks will be recovered during the process. The process is illustrated in FIG. 17. Thus, referring back to FIG. 18, for each pruned block, its query signature (the average color of the pruned block plus the surrounding pixels) will be used to match the signatures of the patches in the library. For each block, the distances (e.g., Euclidean, although, of course, other distance metrics may be used) between the query vector and the signatures of the patches in the library are calculated. The patches are sorted according to the distances, resulting in a rank list. In the ideal case, the best-match high-resolution patch should be at the top of the rank list. However, due to the noise caused by arithmetic rounding and compression, the best-match patch is often not the first one in the rank list. Presume that the correct patch is the $n^{th}$ patch in the rank list. The rank number n will be saved as the metadata for the block. It should be noted that, in the most cases, n is 1 or a very small number because the best-match patch is close to the top in the rank list, therefore the entropy of this random number is significantly smaller than the index of the best-match patch in the library, which should be a uniform distribution having maximum entropy. Therefore, the rank number can be more efficiently encoded by entropy coding. The rank numbers of all the pruned blocks form a rank number sequence as part of the metadata sent to the decoder side. It is observed from the actual experiments that the distribution of the rank numbers is close to a geometric distribution, therefore currently the Golomb code is used for further encoding the rank number sequence, since Golomb code is optimal for a random number having geometric distribution. Of course, other types of codes may also be used in accordance with the teachings of the present principles, while maintaining the spirit of the present principles.

For decoding (see FIG. 19), the decoder side should have the exactly the same patch library as the encoder, as the signature of the pruned block will be used to match with the signatures in the patch library and get a rank list (the sorted patch library). The rank number is used to retrieve the correct patch from the sorted patch library. If the patch library is created from previous frames, in order to ensure the encoder and decoder side have exactly the same patch library, the metadata encoding process at the encoder side should also use the decoded frames from the video decoder because only the decoded frames are available at the decoder side.

Figure 19:
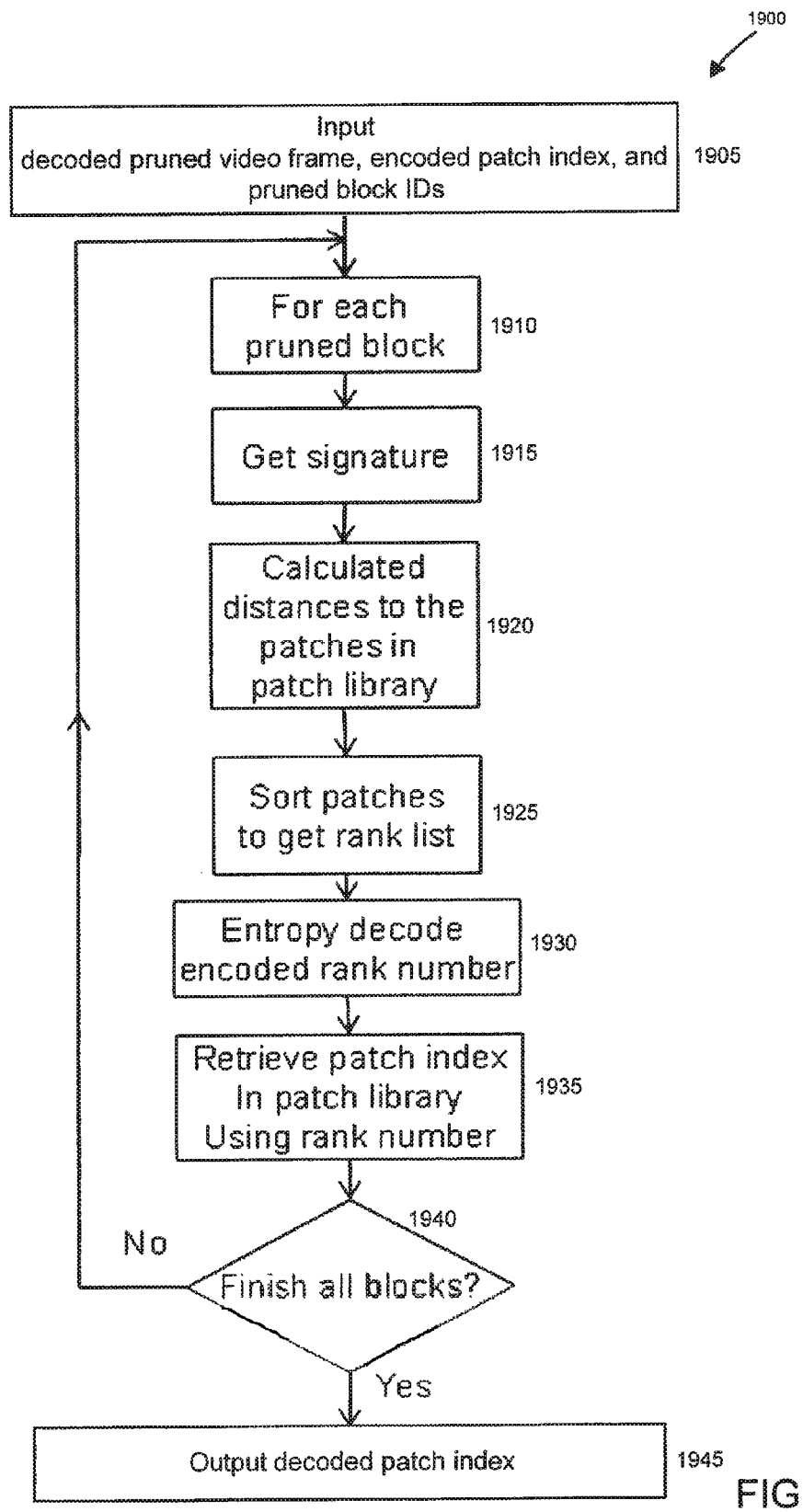
FIG. 19 is a flow diagram showing an exemplary method for decoding a patch index, in accordance with an embodiment of the present principles.

Turning to FIG. 19, an exemplary method for decoding a patch index is indicated generally by the reference numeral 1900. At step 1905, a decoded pruned video frame, an encoded patch index, and pruned block IDs are input. At step 1910, a loop is performed for each pruned block. At step 1915, a signature is obtained. At step 1920, the distances to the patches in the patch library are calculated. At step 1925, the patches are sorted to obtain a rank list. At step 1930, the encoded rank number is entropy decoded. At step 1935, the patch index is retrieved from the patch library using the rank number. At step 1940, it is determined whether or not all blocks are finished (being processed). If so, then the method proceeds to step 1945. Otherwise, the method returns to step 1910. At step 1945, the decoded patch index is output.

Figure 20:
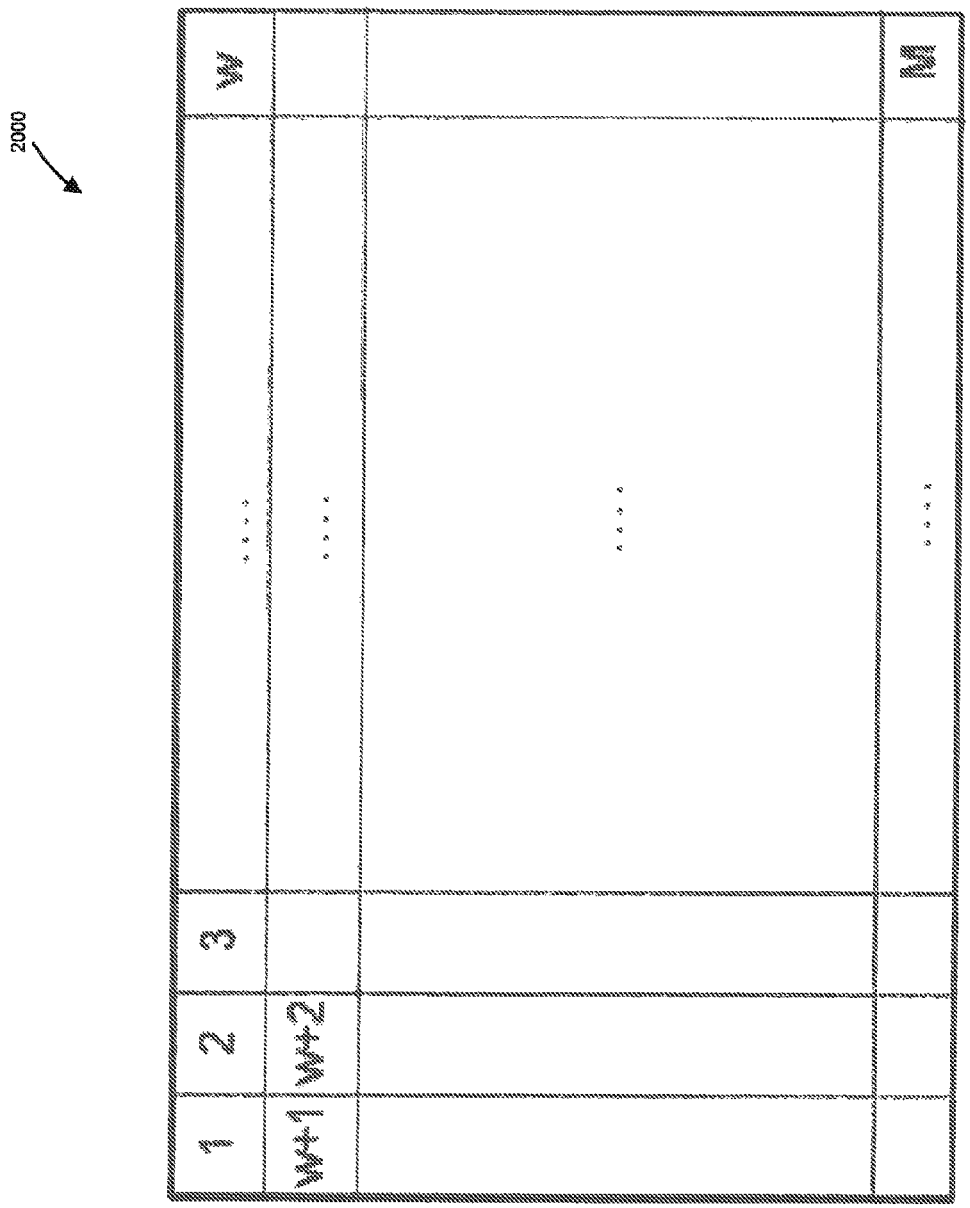
FIG. 20 is a diagram showing an exemplary block ID, in accordance with an embodiment of the present principles.

Besides the rank number metadata, it is necessary to send the locations of the pruned blocks to the decoder side. This is done by block ID encoding (see FIG. 17). One simple way is to just send a block ID sequence to the decoder side. The ID of a block indicates the coordinate of the block on the frame. Turning to FIG. 20, an exemplary block ID is indicated generally by the reference numeral 2000. However, it is also possible to more efficiently encode the ID sequence of the pruned blocks. Since the pruned blocks are flat and do not include any high-frequency components, it is possible to detect the pruned blocks by calculating the color variation within the blocks. If the color variation is smaller than a threshold, then the block is identified as a pruned block. However, since such an identification process is not reliable due to noise caused by compression, metadata is needed to facilitate the identification process. First, the variance threshold is determined by starting from a high threshold value. The algorithm then slowly decrease the variance threshold such that all pruned blocks can be identified by the identification procedure, but false positive blocks may be present in the identified results. Afterwards, if the number of the false positives is larger than that of the pruned blocks, the IDs of the pruned blocks are saved and sent to decoder, otherwise the IDs of the false positives would be sent to the decoder side. The variance threshold for identifying flat blocks is also sent to the decoder side for running the same identification procedure. For the pruning method with causal recovery as described above, the order of the block IDs does not matter, so the ID sequence can be sorted so that the numbers are increasing.

To further reduce redundancy, it is possible to have a differential coding scheme to compute the difference between an ID number to its previous ID number, and encode the difference sequence. For example, assuming the ID sequence is 3, 4, 5, 8, 13, 14, the differentiated sequence becomes 3, 1, 1, 3, 5, 1. The differentiation process makes the numbers closer to 1, therefore resulting in a number distribution with smaller entropy. The differentiated sequence then can be further encoded with entropy coding (e.g., Golomb code in our current implementation). Thus, the format of the final metadata is shown as follows:

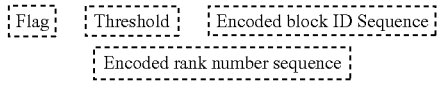

where flag is a signaling flag to indicate whether or not the block ID sequence is a false positive ID sequence, the threshold is the variance threshold for flat block identification, the encoded block ID sequence is the encoded bit stream of the pruned block IDs or the false positive block IDs, and the encoded rank number sequence is the encoded bit stream of the rank numbers used for block recovery.

Pruning Process for the Rest of the Frames in a GOP

For the rest of the frames in a GOP, some of the blocks in the frames will be also replaced by flat blocks. The positions of the pruned blocks in the first frame can be propagated to the rest of the frames by motion tracking. Different strategies are tried to propagate the positions of the pruned blocks. One approach is to track the pruned blocks across frames by block matching, and prune the corresponding blocks in the subsequent frames (i.e., replace the tracked blocks with flat blocks). However, this approach does not result in good compression efficiency gain because, in general, the boundaries of the tracked blocks do not align with the coding macro blocks. As a result, the boundaries of the tracked blocks create a high frequency signal in the macro blocks. Therefore, a simpler alternative approach is currently used to set all the block positions for the subsequent frames to the same positions as the first frame. Namely, all the pruned blocks in the subsequent frames are collocated with the pruned blocks in the first frame. As a result, all of the pruned blocks for the subsequent frames are aligned with macro block positions.

Figure 21:
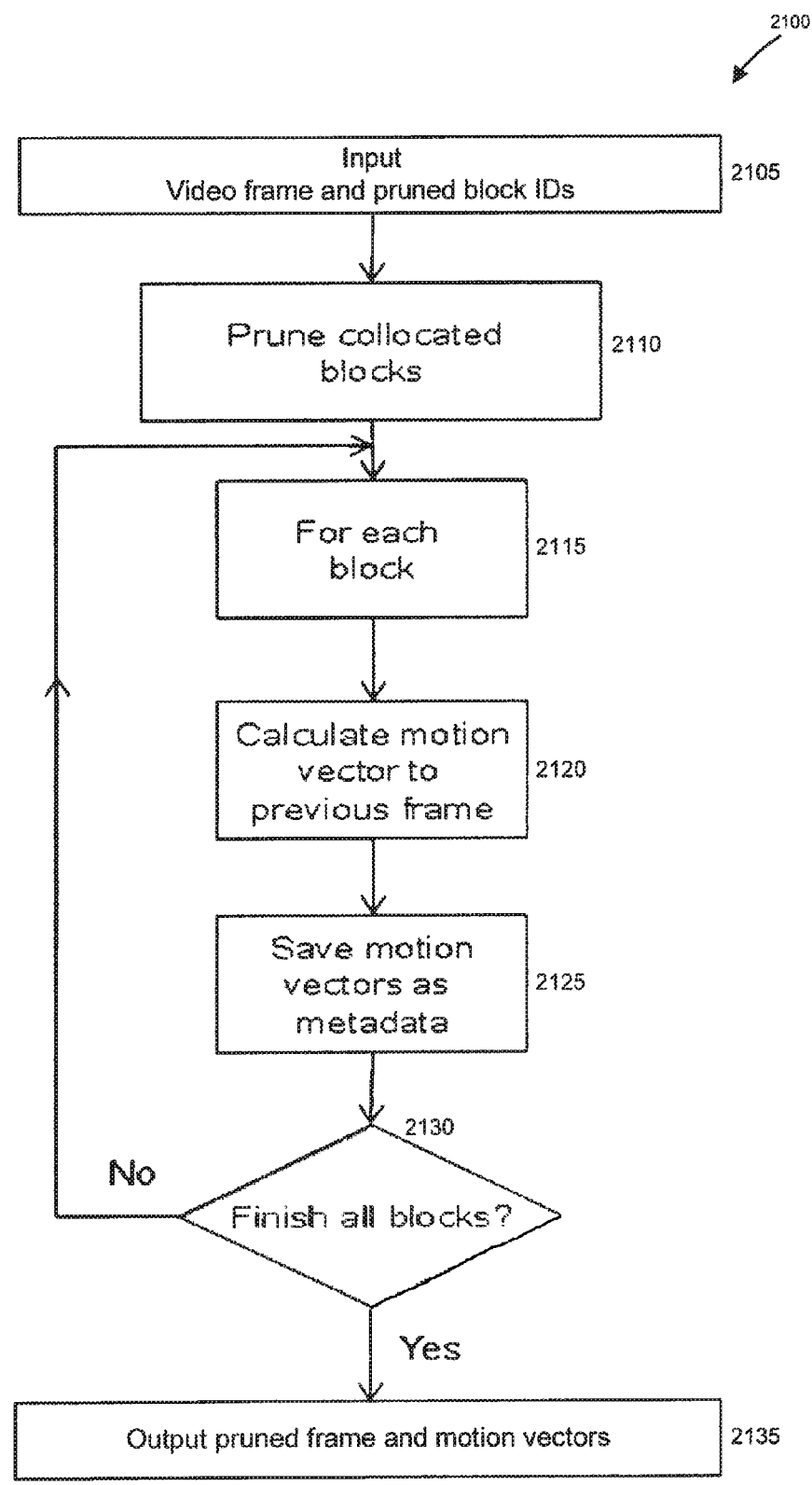
FIG. 21 is a flow diagram showing an exemplary method for pruning sequent frames, in accordance with an embodiment of the present principles.

However, this approach would not work well if there is motion in the pruned blocks. Therefore, one solution to solve the problem is to detect calculate the motion intensity of the block (see FIG. 21). Turning to FIG. 21, an exemplary method for pruning sequent frames is indicated generally by the reference numeral 2100. At step 2105, a video frame and pruned block IDs are input. At step 2110, collocated blocks are pruned. At step 2115, a loop is performed for each block. At step 2120, a motion vector is calculated to the previous frame. At step 2125, the motion vectors are saved as metadata. At step 2130, it is determined whether or not all blocks are finished (being processed). If so, then the method proceeds to step 2135. Otherwise, the method returns to step 2115.

Figure 22:
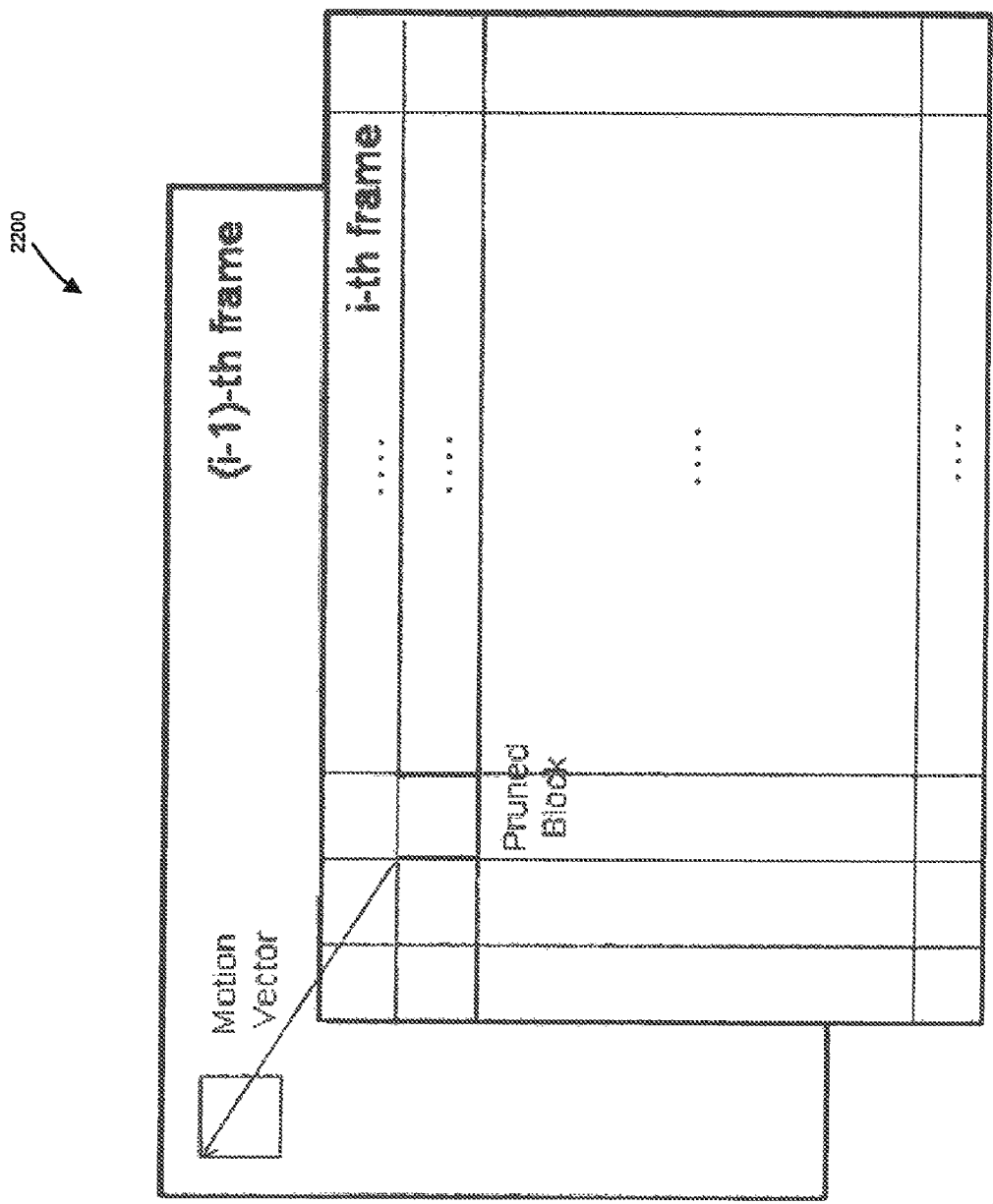
FIG. 22 is a diagram showing an exemplary motion vector for a pruned block, in accordance with an embodiment of the present principles.

If the motion intensity is larger than a threshold, the block would not be pruned. Another more sophisticated solution, which is our current implementation, is to calculate the motion vectors of the pruned blocks in the original video by finding the corresponding block in the previous frame (see FIG. 22). Turning to FIG. 22, an exemplary motion vector for a pruned block is indicated generally by the reference numeral 2200. The motion vector 2200 relates to a pruned block in an i-th frame and a co-located block in a (i–1)-th frame. The motion vectors of the pruned blocks would be sent to the decoder side for a recovery purpose. Since the previous frame would already have been completely recovered, the pruned blocks in the current frame can be recovered using the motion vectors. To avoid artifacts, if the difference between the block in the current frame and the corresponding patch block calculated by motion estimation in the previous frame is too large, then the block in the current frame would not be pruned. Furthermore, subpixel motion estimation is currently used to make motion vector based recovery more accurate. Our experiments show that the resultant visual quality using subpixel based motion vector estimation is much better than that using regular pixel based motion vector estimation.

Recovery Process

The recovery process takes place at the decoder side. The patch library is created before the recovery process by obtaining all the overlapping patches and creating the signatures using the first decoded frame in the GOP. However, different from the aforementioned first approach, the patch library has to be dynamically updated during the recovery process, because the pruned blocks in the frame will be replaced with the recovered blocks during the recovery process.

Figure 23:
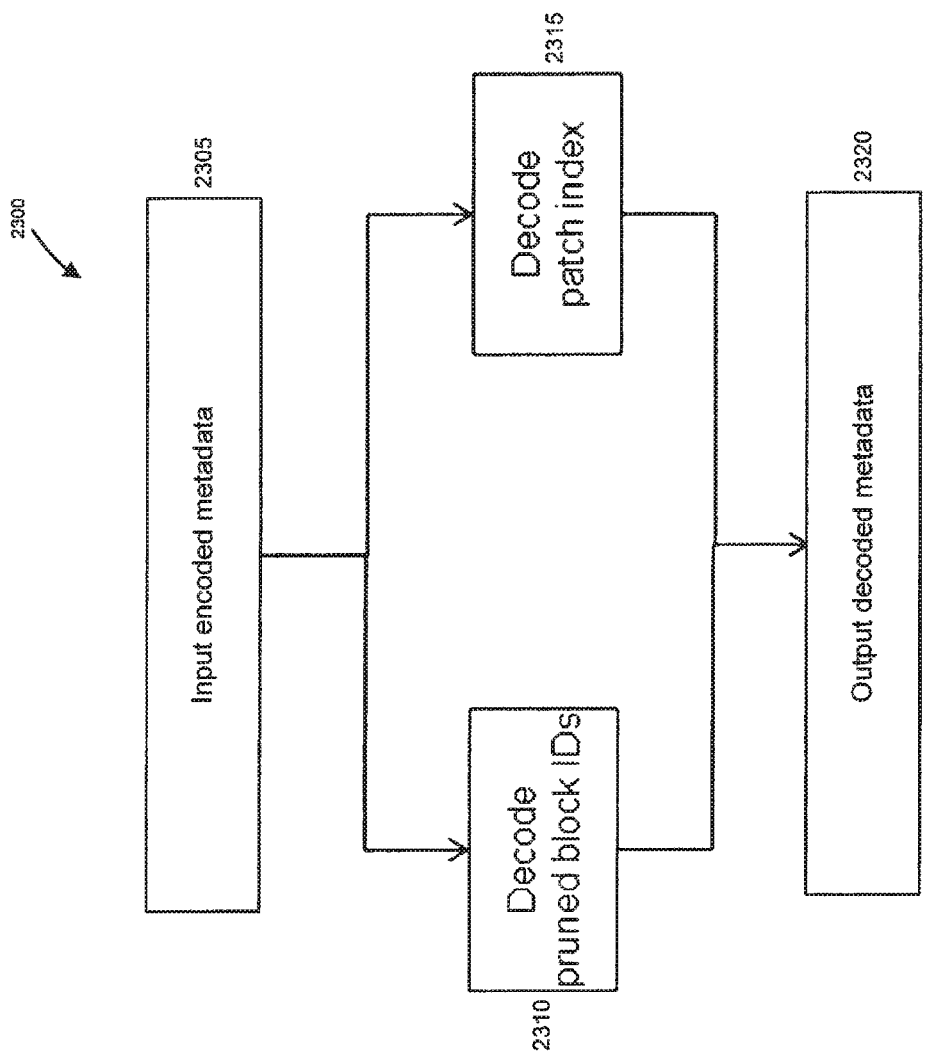
FIG. 23 is a flow diagram showing an exemplary method for decoding metadata, in accordance with an embodiment of the present principles.

For the first frame in a GOP, the recovery process starts with decoding the metadata (see FIG. 23), including decoding the block ID sequence (see FIG. 24) and the rank order sequence (see FIG. 23). Turning to FIG. 23, an exemplary method for decoding metadata is indicated generally by the reference numeral 2300. At step 2305, encoded metadata is input. At step 2310, pruned block IDS are decoded. At step 2315, a patch index is decoded. At step 2320, decoded metadata is output.

Figure 24:
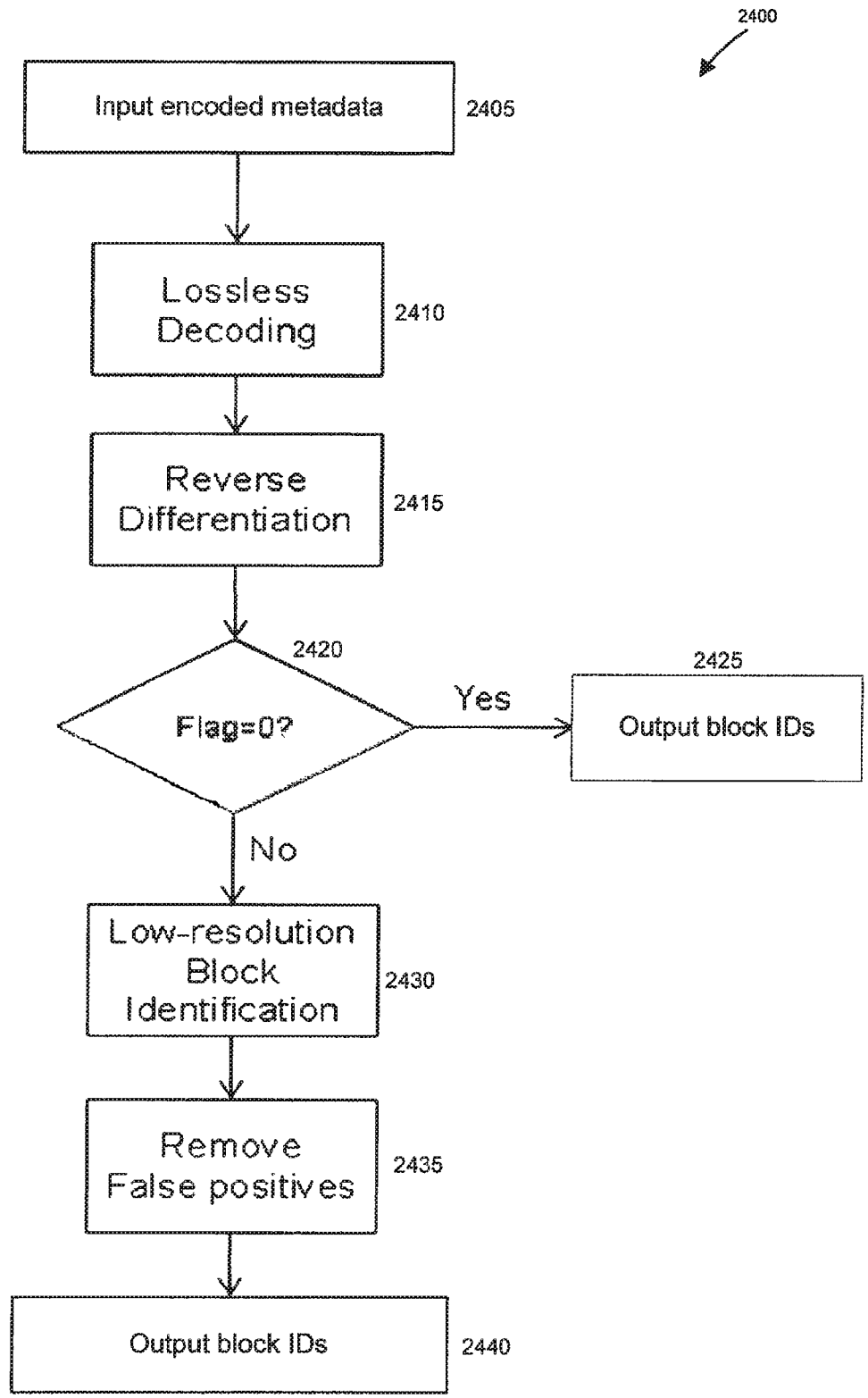
FIG. 24 is a flow diagram showing an exemplary method for decoding pruned block IDs, in accordance with an embodiment of the present principles.

Turning to FIG. 24, an exemplary method for decoding pruned block IDs is indicated generally by the reference numeral 2400. At step 2405, encoded metadata is input. At step 2410, lossless decoding is performed. At step 2415, reverse differentiation is performed. At step 2420, it is determined whether or not a flag is equal to zero. If so, then the method proceeds to step 2425. Otherwise, the method proceeds to step 2430. At step 2425, block IDs are output. At step 2430, a low resolution block identification is performed. At step 2435, false positives are removed. At step 2440, block IDs are output.

After the block ID sequence is available, for each pruned block, the average color and surrounding pixels of this block will be taken as the signature to match with the signatures in the patch library. However, if the neighboring blocks of the block for recovery are also pruned, then the set of surrounding pixels used as the signature for search only includes the pixels from the non-pruned blocks. If all the neighboring blocks are pruned, then only the average color is used as the signature. The matching process is realized by calculating the Euclidean distances between the signature of the query block and those of the patches in the library. After all the distances are calculated, the list is sorted according to the distances, resulting in a rank list. The rank number corresponding to the pruned block then is used to retrieve the correct high-resolution block from the rank list.

Figure 25:
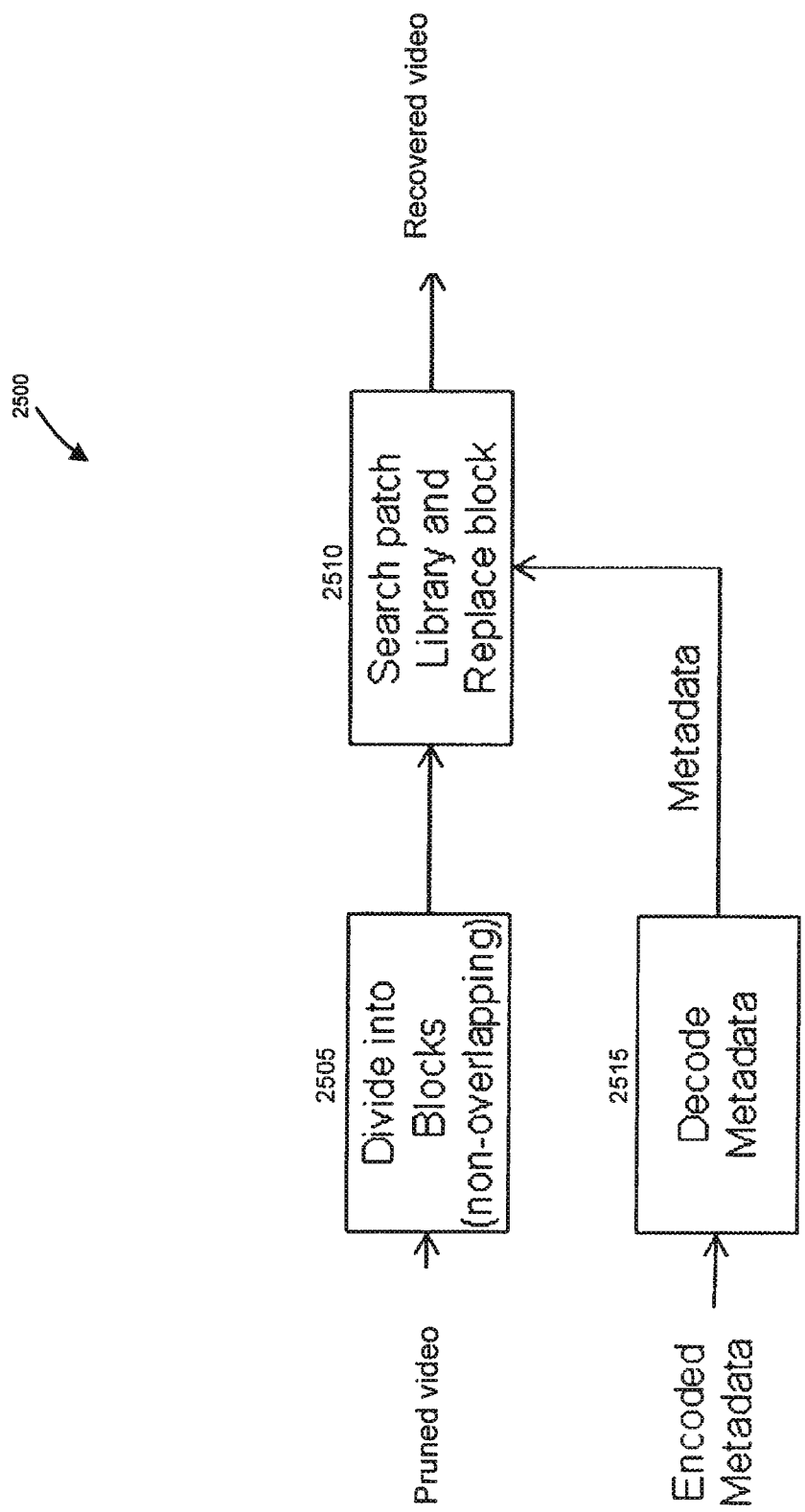
FIG. 25 is a block diagram showing an exemplary apparatus for performing decoder side processing for example-based data pruning using intra-frame patch similarity, in accordance with an embodiment of the present principles.

Turning to FIG. 25, an exemplary apparatus for performing decoder side processing for example-based data pruning using intra-frame patch similarity is indicated generally by the reference numeral 2500. The apparatus 2500 includes a divider 2505 having an output connected in signal communication with a first input of a search patch library and replacement block device 2510. An output of a metadata decoder 2515 is connected in signal communication with a second input of the search patch library and replacement block device 2510. An input of the divider 2505 is available as an input of the apparatus 2500, for receiving pruned video. An input of the metadata decoder 2515 is available as an input of the apparatus 2500, for receiving encoded metadata. An output of the search patch library and replacement block device 2510 is available as an output of the apparatus, for outputting recovered video.

Figure 26:
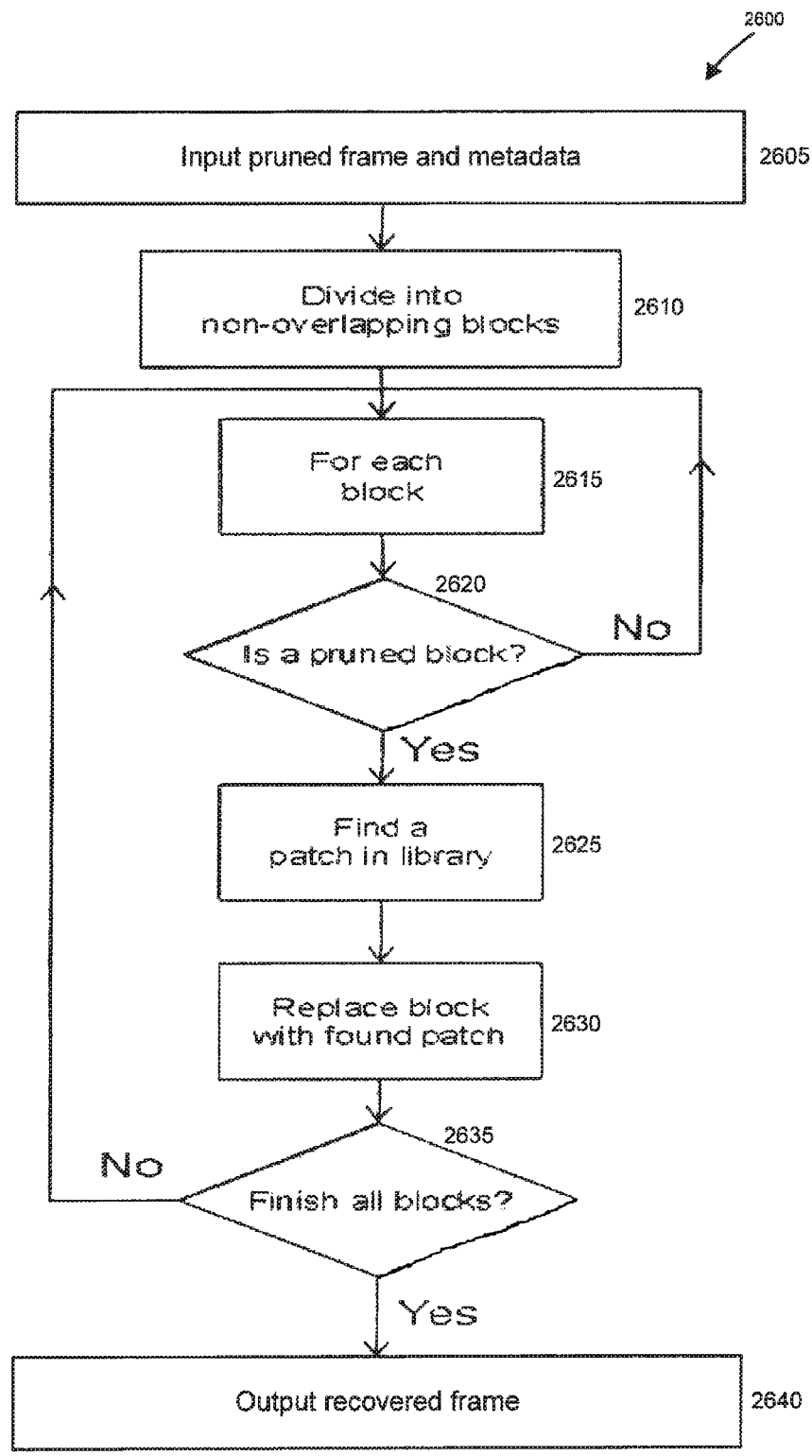
FIG. 26 is a flow diagram showing an exemplary method for recovering a pruned frame, in accordance with an embodiment of the present principles.

Turning to FIG. 26, an exemplary method for recovering a pruned frame is indicated generally by the reference numeral 2600. At step 2605, a pruned frame and corresponding metadata are input. At step 2610, the pruned frame is divided into non-overlapping blocks. At step 2615, a loop is performed for each block. At step 2620, it is determined whether or not the current block is a pruned block. If so, then the method proceeds to step 2625. Otherwise, the method returns to step 2615. At step 2625, a patch is found in the library. At step 2630, a current block is replaced with the found patch. At step 2635, it is determined whether or not all blocks are finished (being processed). If so, then the method proceeds to step 2640. Otherwise, the method returns to step 2615. At step 2640, the recovered frame is output.

It is to be appreciated that the block recovery using example patches can be replaced by traditional inpainting and texture synthesis based methods.

Note that for the pruning scheme with dependency graph as described above, the recovery process has to follow the order of the block IDs in the ID sequence so that whenever a block is being recovered, its corresponding patch is available in the patch library. Furthermore, after each block is recovered, the patch library has to be updated, i.e., the patches overlapping with the block have to be replaced with new patches and the signatures for those patches and their neighbors have to be recalculated.

Figure 27:
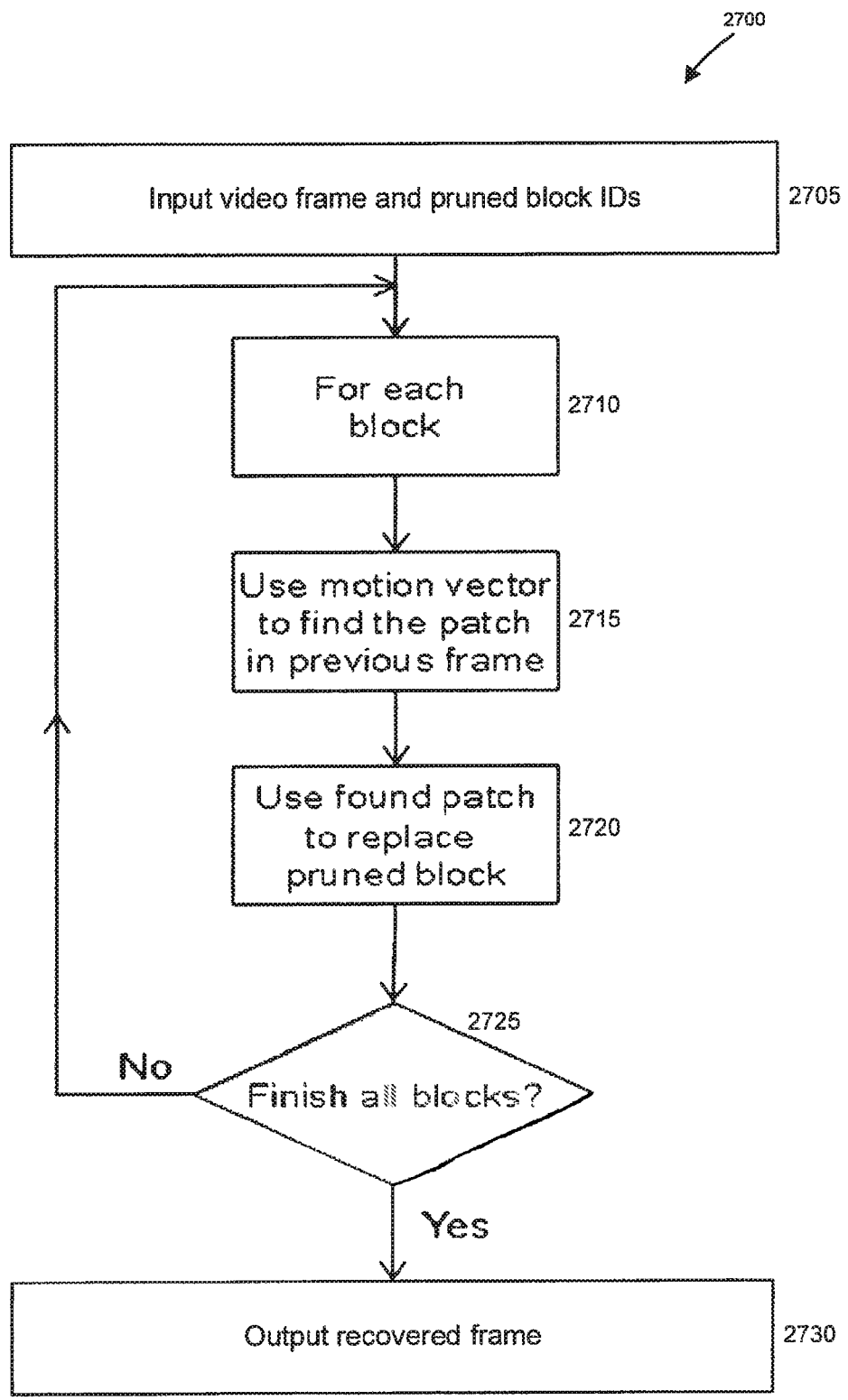
FIG. 27 is a flow diagram showing an exemplary method for recovering subsequent frames, in accordance with an embodiment of the present principles.

For the rest of the frames in a GOP, for each pruned block, if the motion vector is not available, the content of the block can be copied from the co-located block in the previous frame. If the motion vector is available, then it is possible to use the motion vector to find the corresponding block in the previous frame, and copy the corresponding block to fill the pruned block. Turning to FIG. 27, an exemplary method for recovering subsequent frames is indicated generally by the reference numeral 2700. At step 2705, a video frame and pruned block IDs are input. At step 2710, a loop is performed for each block. At step 2715, a motion vector is used to find the patch in the previous frame. At step 2720, the found patch is used to replace the pruned block. At step 2725, it is determined whether or not all blocks are finished (being processed). If so, then the method proceeds to step 2730. Otherwise, the method returns to step 2710.

Block artifacts may be visible since the recovery process is block-based. A deblocking filter, such as the in-loop deblocking filter used in the MPEG-4 AVC Standard encoder, can be applied to reduce the block artifacts.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
    a processor;
    a memory storing a computer program;
    when executed by said processor, said program causing said processor to act as:
    a divider operative to divide said pruned version of said picture into a plurality of non-overlapping blocks;
    a decoder operative to decode metadata for use in recovering said pruned version of said picture;
    a patch library creator operative to create a patch library from a reconstructed version of said picture, said patch library including a plurality of high resolution replacement patches for replacing a plurality of pruned blocks during a recovery of said pruned version of said picture; and
    a search and replacement device operative to perform a searching process using said metadata to find corresponding patches for respective ones of said plurality of pruned blocks among said plurality of non-overlapping blocks and to replace said respective ones of said plurality of pruned blocks with said corresponding patches,
    said search and replacement device operative to create a first plurality of signatures for respective ones of said plurality of pruned blocks,
    said search and replacement device operative to recover said pruned version of said picture by comparing a distance between each one of said first plurality of signatures and each one of a second plurality of signatures for respective ones of said plurality of high resolution patches and by utilizing a patch dependency graph having a plurality of nodes and a plurality of edges, said plurality of nodes representing respective ones of a plurality of overlapping blocks, said plurality of edges representing respective ones of dependencies of said plurality of overlapping blocks, and said search and replacement device operative to sort said distance to obtain a rank list for each one of said plurality of pruned blocks, wherein a rank number in said rank list for a particular one of said plurality of pruned blocks is used to retrieve a corresponding one of said plurality of high resolution patches in said patch library to be used to replace said particular one of said plurality of pruned blocks.

2. The apparatus of claim 1, wherein all pixels in said plurality of pruned blocks have one of a same color value and a low resolution.

3. The apparatus of claim 2, wherein said same color value for a particular one of said plurality of pruned blocks is equal to an average of color values of said pixels in said particular one of said plurality of pruned blocks.

4. The apparatus of claim 1, wherein said metadata includes a patch index for identifying a best matching patch for each one of said plurality of non-overlapping blocks and a block identifier for identifying a plurality of pruned blocks from among said plurality of non-overlapping blocks.

5. A method, comprising:
receiving a pruned version of a picture in a video sequence;
dividing said pruned version of said picture into a plurality of non-overlapping blocks;
decoding metadata for use in recovering said pruned version of said picture;
creating a patch library from a reconstructed version of said picture, said patch library including a plurality of high resolution replacement patches for replacing a plurality of pruned blocks during a recovery of said pruned version of said picture;
performing a searching process using said metadata to find corresponding patches for respective ones of said plurality of pruned blocks among said plurality of non-overlapping blocks and to replace said respective ones of said plurality of pruned blocks with said corresponding patches;
creating a first plurality of signatures for respective ones of said plurality of pruned blocks;
recovering said pruned version of said picture by comparing a distance between each one of said first plurality of signatures and each one of a second plurality of signatures for respective ones of said plurality of high resolution patches and by utilizing a patch dependency graph having a plurality of nodes and a plurality of edges, said plurality of nodes representing respective ones of a plurality of overlapping blocks, said plurality of edges representing respective ones of dependencies of said plurality of overlapping blocks; and
sorting said distance to obtain a rank list for each one of said plurality of pruned blocks, wherein a rank number in said rank list for a particular one of said plurality of pruned blocks is used to retrieve a corresponding one of said plurality of high resolution patches in said patch library to be used to replace said particular one of said plurality of pruned blocks.

6. The method of claim 5, wherein all pixels in said plurality of pruned blocks have one of a same color value and a low resolution.

7. The method of claim 6, wherein said same color value for a particular one of said plurality of pruned blocks is equal to an average of color values of said pixels in said particular one of said plurality pruned blocks.

8. The method of claim 5, wherein said metadata includes a patch index for identifying a best matching patch for each of said plurality of non-overlapping blocks and a block identifier for identifying a plurality of pruned blocks from among said plurality of non-overlapping blocks.

9. An apparatus, comprising:
first means for receiving a pruned version of a picture in a video sequence;
second means for dividing said pruned version of said picture into a plurality of non-overlapping blocks;
third means for decoding metadata for use in recovering said pruned version of said picture; and
fourth means for creating a patch library from a reconstructed version of said picture, said patch library including a plurality of high resolution replacement patches for replacing a plurality of pruned blocks during a recovery of said pruned version of said picture,
said fourth means performing a searching process using said metadata to find corresponding patches for respective ones of said plurality of pruned blocks among said plurality of non-overlapping blocks and to replace said respective ones of said plurality of pruned blocks with said corresponding patches,
said fourth means creating a first plurality of signatures for respective ones of said plurality of pruned blocks,
said fourth means recovering said pruned version of said picture by comparing a distance between each one of said first plurality of signatures and each one of a second plurality of signatures for respective ones of said plurality of high resolution patches and by utilizing a patch dependency graph having a plurality of nodes and a plurality of edges, said plurality of nodes representing respective ones of a plurality of overlapping blocks, said plurality of edges representing respective ones of dependencies of said plurality of overlapping blocks, and
said fourth means sorting said distance to obtain a rank list for each one of said plurality of pruned blocks, wherein a rank number in said rank list for a particular one of said plurality of pruned blocks is used to retrieve a corresponding one of said plurality of high resolution patches in said patch library to be used to replace said particular one of said plurality of pruned blocks.

10. The apparatus of claim 9, wherein all pixels in said plurality of pruned blocks have one of a same color value and a low resolution.

11. The apparatus of claim 10, wherein said same color value for a particular one of said plurality of pruned blocks is equal to an average of color values of said pixels in said particular one of said one or more pruned blocks.

12. The apparatus of claim 9, wherein said metadata includes a patch index for identifying a best matching patch for each one of said plurality of non-overlapping blocks and a block identifier for identifying a plurality of pruned blocks among said plurality of non-overlapping blocks.

* * * * *